(12) United States Patent
Kurishige et al.

(10) Patent No.: US 6,246,197 B1
(45) Date of Patent: *Jun. 12, 2001

(54) ELECTRIC POWER STEERING CONTROLLER

(75) Inventors: Masahiko Kurishige; Noriyuki Inoue; Takayuki Kifuku; Munenori Yamamoto; Shunichi Wada, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,349

(22) Filed: Mar. 19, 1998

(30) Foreign Application Priority Data

Sep. 5, 1997 (JP) .................................................. 9-240611

(51) Int. Cl.[7] ....................................................... H02P 7/00
(52) U.S. Cl. ............................ 318/432; 318/434; 701/41; 180/443
(58) Field of Search ................................... 318/432, 434; 180/443–446, 400; 701/41, 43

(56) References Cited

U.S. PATENT DOCUMENTS

| 4,943,758 | * | 7/1990 | Tsurumiya ............................. 318/504 |
| 5,553,684 | * | 9/1996 | Wada et al. ........................... 318/432 |
| 5,623,409 | * | 4/1997 | Miller .................................... 180/443 |
| 5,652,487 | * | 7/1997 | Nishino et al. ....................... 318/434 |
| 5,703,456 | * | 12/1997 | Cox ....................................... 318/138 |
| 5,780,980 | * | 7/1998 | Naito .................................... 318/139 |
| 5,786,679 | * | 7/1998 | Nishino et al. ....................... 318/439 |
| 6,131,059 | * | 10/2000 | Kaji et al. .............................. 701/41 |

FOREIGN PATENT DOCUMENTS

| 718 174 | 6/1996 | (EP) . |
| 8-175404 | 7/1996 | (JP) . |

* cited by examiner

*Primary Examiner*—David S. Martin
(74) *Attorney, Agent, or Firm*—Sughrue, Mion, Zinn, Macpeak & Seas, PLLC

(57) ABSTRACT

To estimate the rotation speed of the motor for assisting a steering torque regardless of the running state of a vehicle with accuracy, an application voltage estimation value obtained by subtracting a correction voltage obtained based on a detection current value detected by current detection means from the inter-terminal voltage measurement value of the motor is output and the rotation speed of the motor is estimated based on this application voltage estimation value and the detection current value.

13 Claims, 24 Drawing Sheets

ELECTRIC POWER STEERING CONTROLLER

BACKGROUND OF THE INVENTION

1. Field of the Invention

This invention relates to an electric power steering controller for use in automobiles.

2. Description of the Prior Art

It is known that, as shown in the following equation (1), when a voltage Va is applied to the coil of a DC motor having a brush, a counter electromotive voltage Ve is produced, a voltage obtained by subtracting the counter electromotive voltage Ve from the application voltage Va to the coil generates a coil current, thereby causing a voltage drop Vc in the coil, and, as shown in the following equation (2), the rotation speed of the motor is proportional to the counter electromotive voltage. Conversely speaking, the counter electromotive voltage is the difference between the application voltage to the coil of the motor and the voltage reduced by the coil. The voltage drop in the coil is expressed by the total of a voltage drop caused by coil resistance and a voltage drop caused by inductance which is proportional to a differential value of current as shown in the following equation (3). The frequency band at which the coil inductance appears as a voltage drop is high and can be generally expressed by the product of a coil resistance value and a coil current as shown in the following equation (3') at a steering frequency range by a car driver except a current response.

Therefore, the rotation speed of the motor can be expressed by the following four equations.

$$Vc = Va - Ve \quad (1)$$

$$Ve = Ke \cdot w \quad (2)$$

$$Vc = Ra \cdot Ia + La \cdot (dIa/dt) \quad (3)$$

$$Vc = Ra \cdot Ia \quad (3')$$

$$w = (Va - Ra \cdot Ia)/Ke \quad (4)$$

In the above equations, Ve is a counter electromotive voltage, Va an application voltage to the coil, Vc a voltage drop in the coil, Ke a counter electromotive voltage constant, w a rotation speed of the motor, Ra a coil resistance, La a coil inductance and Ia a coil current.

For example, FIG. 28 is a flow chart showing a method for detecting the rotation speed of a motor in a conventional electric power steering controller disclosed in Japanese Laid-open Patent Application No. Hei 8-175404. In FIG. 28, steps S1 to S5 are algorithm steps for detecting the rotation speed of the motor.

A description is subsequently given of the method for detecting the rotation speed of the motor in the conventional electric power steering controller.

In the conventional rotation speed detection method, a detection value of voltage applied to both terminals of the motor and a current value running through the coil are first read in step S1. In the subsequent step S2, a coil resistance equivalent value Rac and a counter electromotive voltage constant equivalent value Kec prestored in a ROM are read. In the next step S3, a rotation speed estimation value correction gain K1 is determined based on the current value running through the coil with reference to a table prestored in the ROM. In the next step S4, a motor rotation speed estimation value west is calculated based on the following equation (5).

$$west = K1 \cdot (Vt\_sns - Isns \times Rac)/Kec \quad (5)$$

wherein west is a motor rotation speed estimation value, Vt_sns is a inter-terminal voltage measurement value, Isns a coil current measurement value, Rac a coil resistance equivalent value, Kec a counter electromotive voltage constant equivalent value, and K1 a motor rotation speed estimation value correction gain.

In the subsequent step S5, the calculated motor rotation speed estimation value west is stored in a RAM. The above procedure is repeated to calculate the motor rotation speed estimation value west each time sampling is made for digital control.

The above rotation speed estimation correction gain K1 is a coefficient which is set to be "1" when the coil current is small and approximate "0" as the coil current increases and which is used to prevent the influence of an error of a coil resistance value or an error caused by temperature variations from growing along with an increase in current.

Although the inter-terminal voltage Vt of the motor is handled as the application voltage Va to the coil in the prior art described above, the actual application voltage Va to the coil is obtained by subtracting a voltage drop Vdrop between a brush and a commutator from an inter-terminal voltage Vt as shown in the following equation (6).

$$Va = Vt - Vdrop \quad (6)$$

wherein Vt is an inter-terminal voltage and Vdrop is a voltage drop between the brush and the commutator.

It is known that the voltage drop Vdrop which is a function of a coil current as shown in FIG. 27 changes according to the coil current in an extremely narrow range and changes its direction according to the direction of the coil current in a normal operation range. Since this voltage drop Vdrop is not taken into account in the prior art, an almost fixed error is always produced in the motor rotation speed estimation value west. Particularly, in a low rotation speed range, the influence of the error becomes relatively large and the accuracy of the motor rotation speed estimation value west lowers. Therefore, when control is made based on this rotation speed estimation value west, if the motor rotation speed is low and the steering torque of a driver is small, for example, when driving straight, the electric power steering controller oscillates and the steering wheel vibrates by itself though the driver does not steer a vehicle.

SUMMARY OF THE INVENTION

The present invention has been made to solve the above problem of the prior art and it is an object of the present invention to provide an electric power steering controller which estimates the rotation speed of the motor for assisting a steering torque with accuracy and always enable stable operation regardless of the running state of a vehicle.

According to a first aspect of the present invention, there is provided an electric power steering controller in which voltage detection means outputs as an application voltage estimation value a value obtained by subtracting a correction voltage obtained based on a detection current value detected by current detection means from the inter-terminal voltage measurement value of a motor and motor rotation speed estimation means estimates a motor rotation speed based on the application voltage estimation value from the voltage detection means and the detection current value from the current detection means.

According to a second aspect of the present invention, there is provided an electric power steering controller in which a correction voltage at the voltage detection means is obtained with reference to voltage drop characteristics between the brush and commutator of the motor.

According to a third aspect of the present invention, there is provided an electric power steering controller in which a correction voltage at the voltage detection means is a value obtained by multiplying a voltage drop between the brush and commutator of the motor by a coefficient smaller than 1.

According to a fourth aspect of the present invention, there is provided an electric power steering controller in which a control unit calculates a target current using a differential signal obtained by differentiating the output of rotation speed estimation means.

According to a fifth aspect of the present invention, there is provided an electric power steering controller in which a correction voltage at the voltage detection means is a function whose upper limit is the maximum voltage drop value between the brush and commutator of the motor or a value obtained by multiplying it by a coefficient smaller than 1 and which is substantially proportional to the output of the current detection means below the upper limit and is saturated at the upper limit to become constant.

According to a sixth aspect of the present invention, there is provided an electric power steering controller in which a correction voltage at the voltage detection means is output by a relay circuit which is switched only by the sign of the output of the current detection means, and the amplitude of the relay circuit is the maximum voltage drop value between the brush and commutator of the motor or a value obtained by multiplying it by a coefficient smaller than 1.

According to a seventh aspect of the present invention, there is provided an electric power steering controller in which a correction voltage at the voltage detection means is output by a relay circuit which is switched only by the sign of the difference between the terminal voltage measurement values of a double-phase motor, and the amplitude of the relay circuit is the maximum voltage drop value between the brush and commutator of the motor or a value obtained by multiplying it by a coefficient smaller than 1.

According to an eighth aspect of the present invention, there is provided an electric power steering controller in which the voltage detection means subtracts correction voltages equivalent to a voltage drop caused by a drive circuit for driving the motor and to a voltage drop between the brush and commutator of the motor from a motor drive voltage instruction value instructed by the control unit.

According to a ninth aspect of the present invention, there is provided an electric power steering controller in which the voltage detection means obtains an application voltage estimation value by weight averaging a first detection voltage obtained by subtracting a correction voltage equivalent to a voltage drop between the brush and commutator of the motor from the inter-terminal voltage measurement value of the motor and a second detection voltage obtained by subtracting correction voltages equivalent to a voltage drop caused by a drive circuit for driving the motor and to a voltage drop between the brush and commutator of the motor from a motor drive voltage instruction value instructed by the control unit, and changes the weights of the first detection voltage and the second detection voltage based on the hysteresis of the output of the current detection means such that the weight of the first detection value is made large when a large current is not detected and the weight of the second detection voltage is made large when a large current is detected.

According to a tenth aspect of the present invention, there is provided an electric power steering controller, wherein the correction voltage is divided into a first correction voltage for obtaining a rotation speed estimation value and a second correction voltage for obtaining a differential signal for the rotation sped estimation value, and the second correction value is made larger than the first correction voltage.

According to an eleventh aspect of the present invention, there is provided an electric power steering controller, wherein the correction voltage calculated based on a target current is subtracted from a motor inter-terminal voltage measurement value, a motor drive voltage instruction value instructed by the control unit, or a weighted mean value thereof.

According to a twelfth aspect of the present invention, there is provided an electric power steering controller, wherein the correction voltage is used as a function of motor voltage hysteresis, set to a value smaller than a normal correction voltage value immediately when a motor inter-terminal voltage measurement value, a motor drive voltage instruction value or a weighted mean value thereof exceeds a predetermined value and increased to a normal correction voltage value along with the passage of time when the above value falls below the predetermined value.

According to a thirteenth aspect of the present invention, there is provided an electric power steering controller, wherein the correction voltage is used as a function of motor voltage hysteresis, set to a value smaller than a normal correction voltage value immediately when an output of the current detection means or a target current value exceeds a predetermined value and increased to a normal correction voltage value along with the passage of time when the above value falls below the predetermined value.

The above and other objects, features and advantages of the invention will become more apparent from the following description when taken in conjunction with the accompanying drawings.

DETAILED DESCRIPTION OF THE PREFERRED EMBODIMENTS

Embodiment 1

Figure 1:
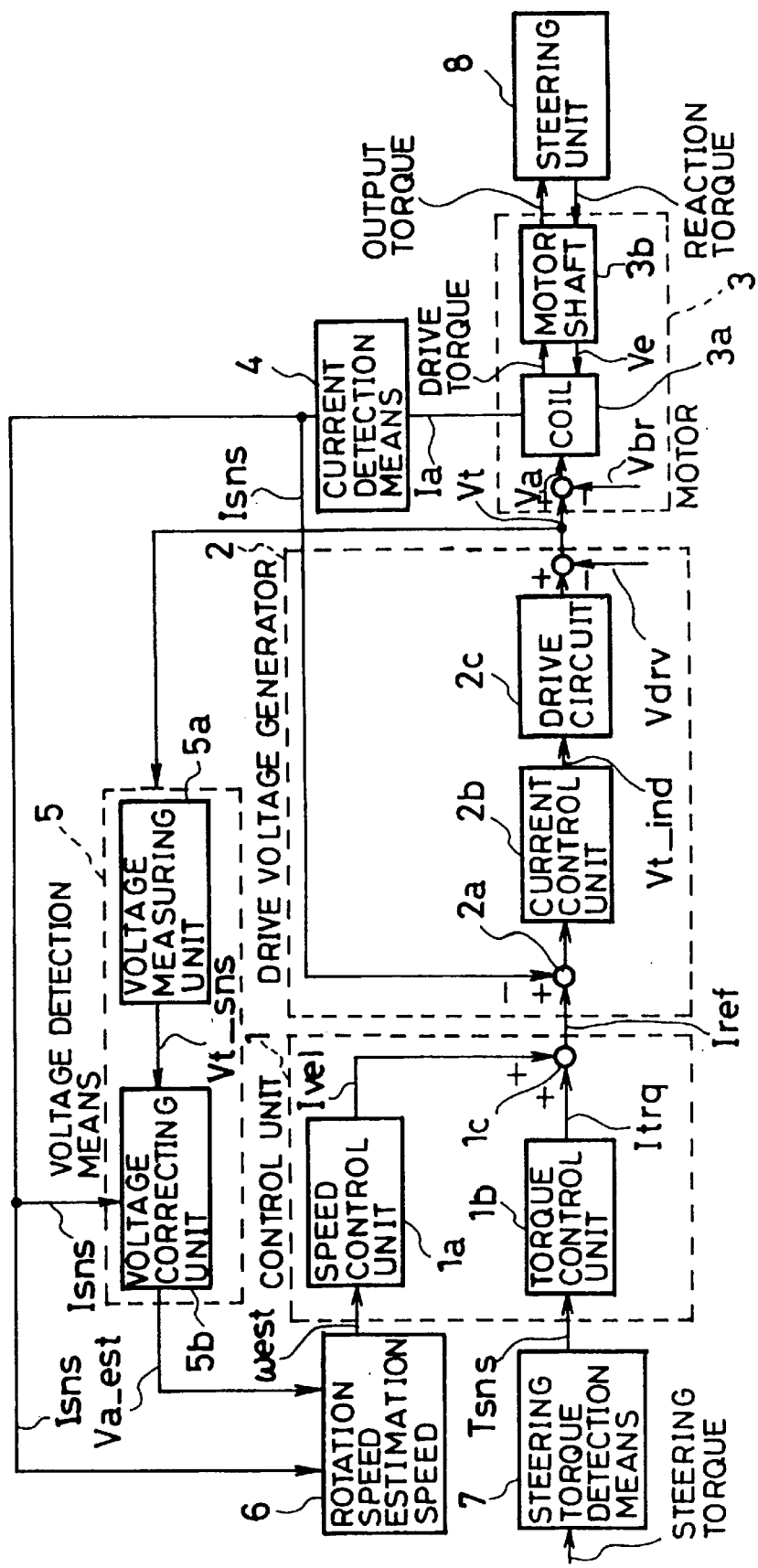
FIG. 1 is a block diagram of an electric power steering controller according to Embodiment 1 of the present invention.

Embodiment 1 of the present invention is described hereinunder with reference to the accompanying drawings. FIG. 1 is a block diagram of an electric power steering controller according to Embodiment 1 of the present invention.

In FIG. 1, reference numeral 1 denotes a control unit for calculating a target current Iref for driving a motor 3, which comprises a speed control unit 1a for calculating a speed compensation current Ivel, a torque control unit 1b for calculating a torque compensation current Itrq from the output Tsns of steering torque detection means 7 for detecting a steering torque by a car driver, and an adder 1c for adding the torque compensation current Itrq and the speed compensation current Ivel to generate a target current Iref. Reference numeral 2 denotes a drive voltage generator for outputting an inter-terminal voltage Vt to be applied to the motor 3 based on the target current Iref generated by the control unit 1, which comprises a subtractor 2a for calculating an error between the target current Iref and the coil current measurement value Isns, a current control unit 2b for calculating a voltage instruction signal Vt_ind such as a DUTY ratio for a PWM signal based on the error or the like, and a drive circuit 2c for outputting an inter-terminal voltage Vt to be applied to the motor 3 based on the voltage instruction signal Vt_ind. Reference numeral 3 represents a motor 3 which comprises a coil 3a whose dynamic behavior determines a coil current Ia based on the inter-terminal voltage Vt output from the drive voltage generator 2 and a motor shaft 3b driven by a torque proportional to the coil current Ia. This motor shaft 3b transmits a torque to a steering unit 8 and receives a reaction torque. Reference numeral 4 represents current detection means for measuring a coil current Ia. Reference numeral 5 denotes voltage detection means which comprises a voltage measuring unit 5a for measuring the inter-terminal voltage Vt of the motor 3 and a voltage correcting unit 5b for correcting an inter-terminal voltage measurement value Vt_sns based on the coil current measurement value Isns and estimating an application voltage estimation value Va_est to the coil 3a. Numeral 6 denotes rotation speed estimation means for obtaining the rotation speed estimation value west of the motor shaft 3b based on the application voltage estimation value Va_est to the coil 3a and the coil current measurement value Isns.

A description is subsequently given of the operation of Embodiment 1 of the present invention.

Figure 2:
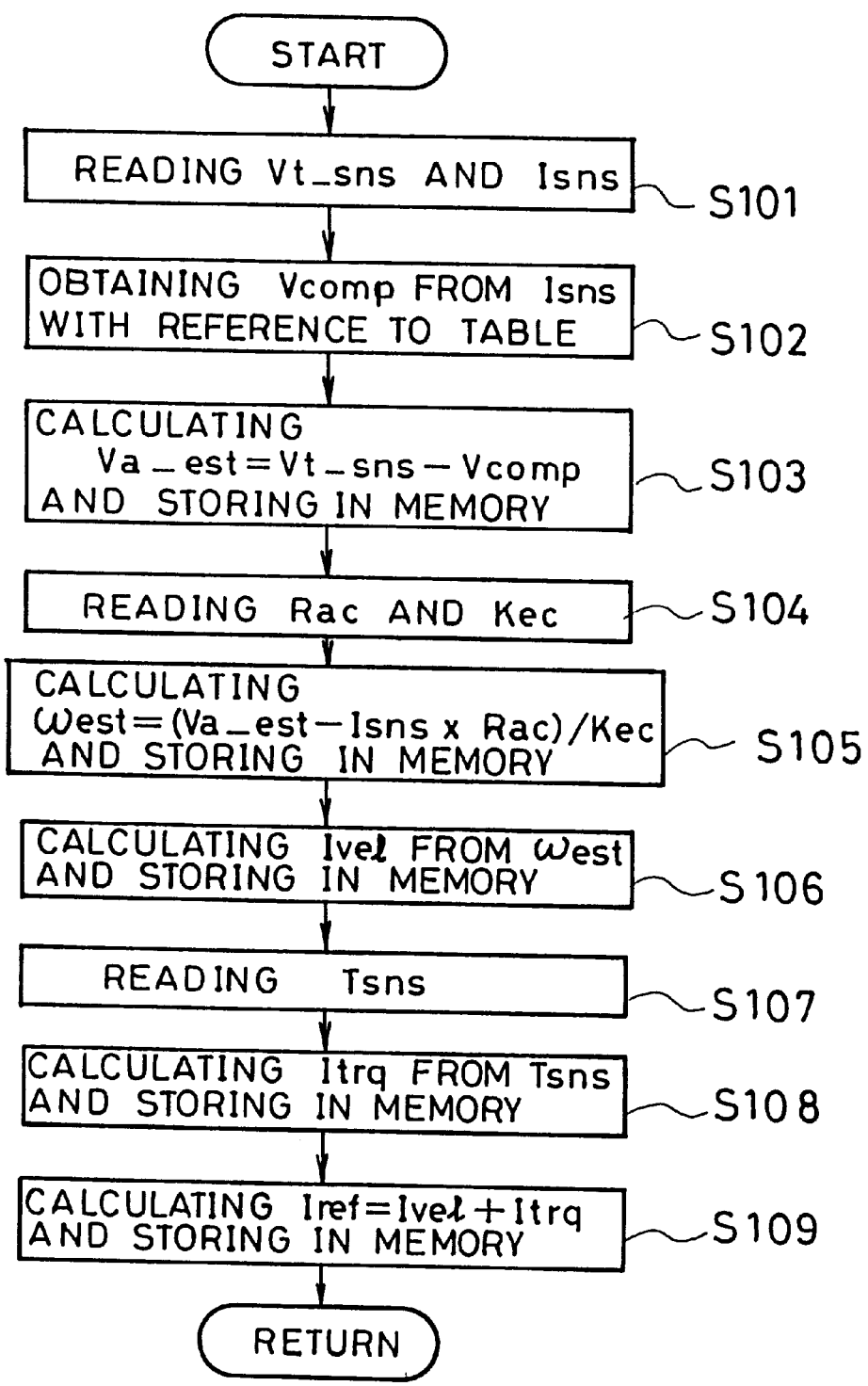
FIG. 2 is a flow chart showing calculation algorithms in Embodiment 1.

An algorithm for calculating a target current Iref from a coil current measurement value Isns and an inter-terminal voltage measurement value Vt_sns is first described with reference to the flow chart of FIG. 2. Steps S101 to 103 show the operation of the voltage correcting unit 5b. In step S101, an inter-terminal voltage measurement value Vt_sns measured by the voltage measuring unit 5a and a coil current measurement value Isns measured by the current detection means 4 are read. In the subsequent step S102, a correction voltage Vcomp for the coil current measurement value Isns is obtained with reference to voltage drop characteristics between a brush and a commutator prestored in a ROM. The correction voltage Vcomp is obtained by multiplying a voltage drop value between the brush and commutator of the motor 3 by a coefficient smaller than 1. In the subsequent step S103, an application voltage estimation value Va_est to the coil 3a is obtained from the following equation (7).

$$Va\_est = Vtsns - Vcomp \tag{7}$$

Steps S104 and 105 show the operation of the rotation speed estimation means 6. In step S104, a coil resistance equivalent value Rac and a counter electromotive voltage constant equivalent value Kec are first read from the ROM. In the subsequent step S105, a motor rotation speed estimation value west is calculated from the following equation (8).

$$west = (Va\_est - Isns \times Rac)/Kec \tag{8}$$

Step S106 shows the operation of the speed control unit 1a for calculating a speed compensation current Ivel from the motor rotation speed estimation value west and storing it in a memory. Steps S107 and S108 show the operation of the torque control unit 1b. In step S107, the output Tsns of the steering torque detection means is first read. In the subsequent step S108, a torque compensation current Itrq is calculated from the output Tsns of the steering torque detection means and stored in the memory. Step S109 shows the operation of the adder 1c for reading and adding the speed compensation current Ivel and the torque compensation current Itrq to obtain a target current Iref and storing it in the memory. The above steps S101 to 109 are repeated each time sampling is made.

A description is subsequently given of the target current Iref calculated by the control unit 1 which serves as an auxiliary torque for a steering torque by a car driver. A difference between the calculated target current Iref and the coil current measurement value Isns is calculated by the subtractor 2a in the drive voltage generator 2 and a so-called current feedback is carried out by the current control unit 2b to determine a voltage instruction signal Vt_ind based on the difference. The voltage instruction signal Vt_ind is current amplified by the drive circuit 2c and becomes an inter-terminal voltage Vt to be applied to the motor 3. The coil current running through the coil 3a is determined by the applied inter-terminal voltage Vt and a counter electromotive voltage Ve proportional to the rotation speed w of the motor shaft 3b. A drive torque is generated in proportion to the coil current Ia and transmitted to the steering unit 8 through the motor shaft 3b to serve as an auxiliary torque for the steering torque of the car driver.

Conversely, the motor shaft 3b receives a reaction torque from the steering unit 8.

The voltage instruction signal Vt_ind is output as a DUTY ratio of PWM, for example. Although a value obtained by multiplying a DUTY ratio by a battery (unshown) voltage is a theoretical inter-terminal voltage Vt, the inter-terminal voltage Vt is actually a voltage obtained by subtracting a voltage drop Vdrv caused by the drive circuit 2c from the voltage instruction signal Vt_ind. The application voltage va to the coil is a voltage obtained by subtracting a voltage drop Vbr between the brush and the commutator from an inter-terminal voltage Vt.

Thus, in this Embodiment 1, the application voltage Va to the coil 3a is estimated by subtracting a correction voltage Vcomp obtained with reference to the table of the coil current measurement value Isns from an inter-terminal voltage measurement value Vt_sns based on the above equation (7) and the motor rotation speed estimation value west is calculated from this estimation value Va_est as shown in the above equation (8). Therefore, it is possible to cancel the influence of the voltage drop Vbr between the brush and the commutator on the motor rotation speed estimation value west and the speed compensation current Ivel based on the motor rotation speed estimation value west always shows designed operation.

While voltage drop values between the brush and the commutator are stored in the ROM as table data in this Embodiment 1, the smallest voltage drop value between the brush and the commutator out of voltage drop values may be stored in the ROM in consideration of errors and time changes of the motor. Thereby, the inversion of the polarity of the motor rotation speed estimation value west which is generated when a correction voltage Vcomp larger than the actual voltage drop Vbr is subtracted can be prevented. Therefore, since the polarity of the amount of control does not change when control is carried out based on the rotation speed estimation value west, excellent controllability without oscillation can be obtained.

The target current Iref may be used in place of the coil current measurement value Isns.

The motor rotation speed estimation value west is obtained by dividing a counter electromotive voltage Ve by a counter electromotive voltage constant equivalent value Kec based on the equation (8). However, the counter electromotive voltage may be used directly as the motor rotation speed estimation value west. In this case, the counter electromotive voltage constant equivalent value Kec may be obtained by adjusting the gain of the control unit 1.

The influence of inductance which is small at a steering frequency range by a driver is not taken into account in the equation (8) for calculating a motor rotation estimation value west. To improve accuracy, the influence of inductance may be taken into account as in the following equation (8'). To this end, a coil inductance equivalent value Lac must be prestored in the ROM and disns must be obtained by differentiating a coil current measurement value Isns.

$$west = (Va\_est - Isns \times Rac - dIsns \times Lac)/Kec \quad (8')$$

Embodiment 2

Figure 3:
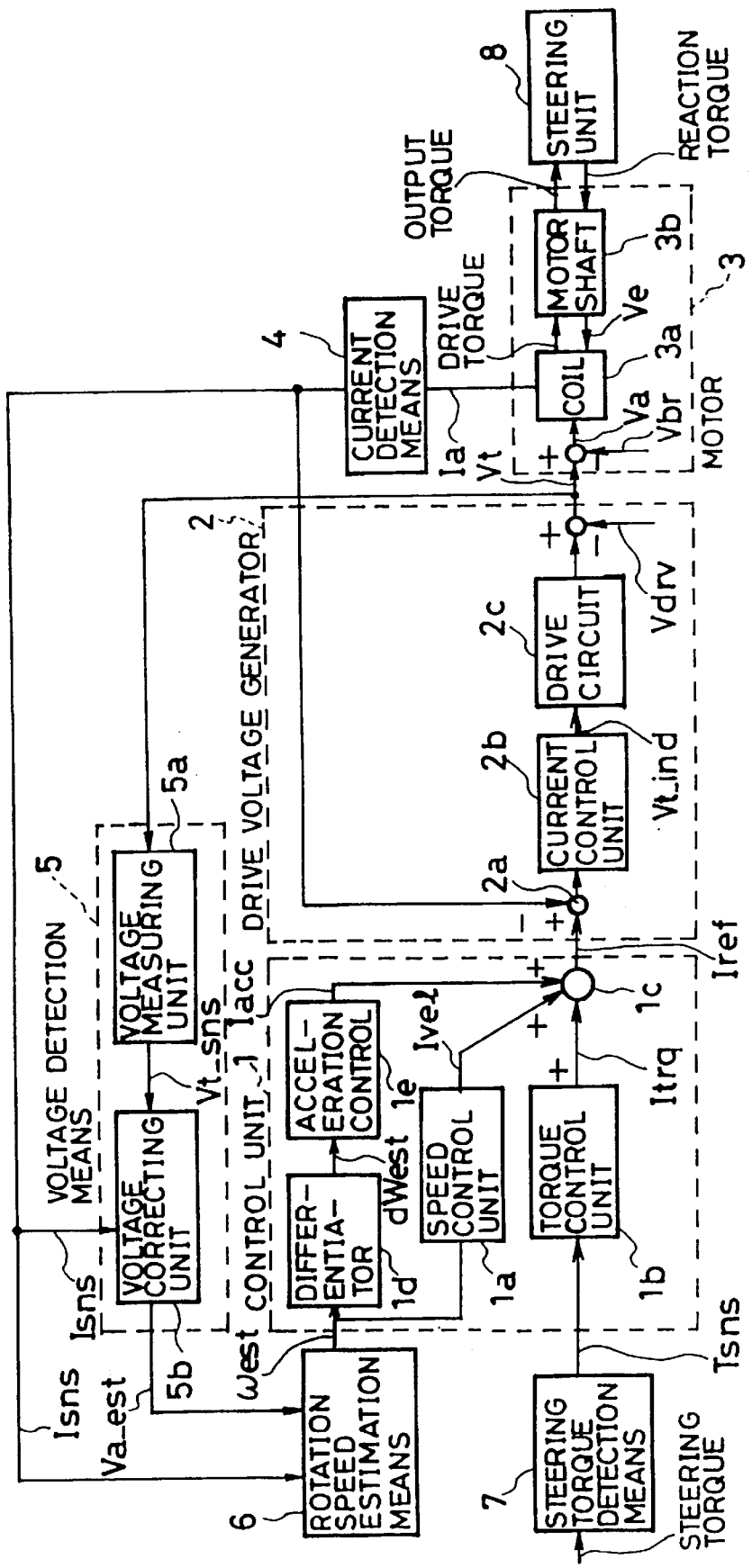
FIG. 3 is a block diagram of an electric power steering controller according to Embodiment 2 of the present invention.

Embodiment 2 of the present invention is described hereinunder with reference to the accompanying drawings. FIG. 3 is a block diagram of an electric power steering controller according to Embodiment 2. Since this Embodiment 2 is the same as Embodiment 1 in configuration except the control unit 1 in FIG. 3, only the control unit 1 is described. In FIG. 3, reference numeral 1 denotes the control unit for driving a target current Iref for driving the motor 3, which comprises a speed control unit 1a for calculating a speed compensation current Ivel based on a motor rotation speed estimation value west estimated by the rotation speed estimation means 6, a torque control unit 1b for calculating a torque compensation current Itrq from the output Tsns of the steering torque detection means 7 for detecting the steering torque of the car driver, a differentiator 1d for time differentiating west estimated by the rotation speed estimation means 6, an acceleration control unit 1e for calculating an acceleration compensation current Iacc based on the output of the differentiator 1d, and an adder 1c for adding the torque compensation current Itrq, the speed compensation current Ivel and the acceleration compensation current Iacc to generate a target current Iref.

A description is subsequently given of the operation of this Embodiment 2.

Figure 4:
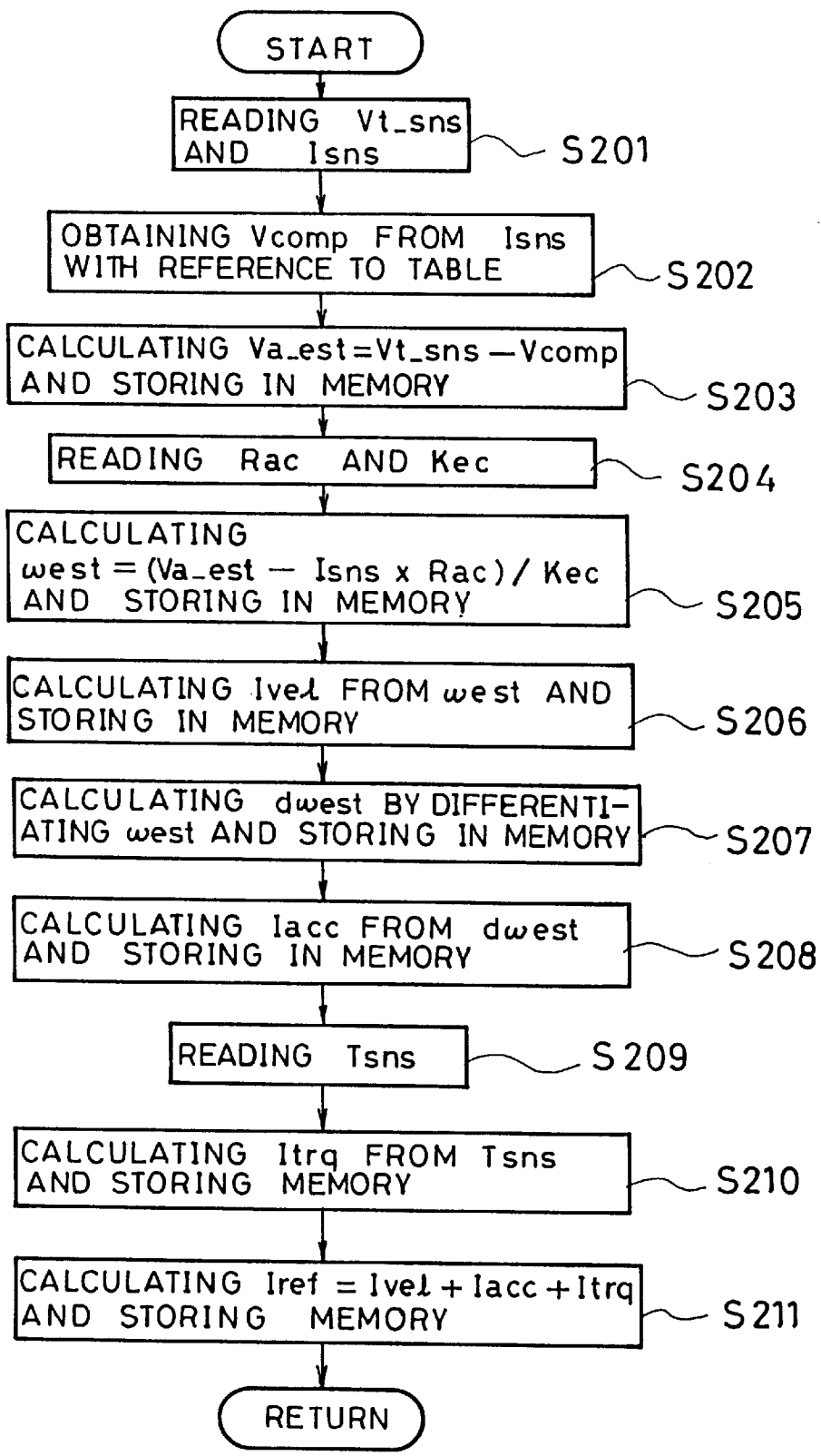
FIG. 4 is a flow chart showing calculation algorithms in Embodiment 2.

Since the operation of this Embodiment 2 before the calculation of a motor rotation speed estimation value west and the operation after the calculation of a target current Iref are the same as those of Embodiment 1, an algorithm from the calculation of the motor rotation speed estimation value west to the calculation of the target current Iref is described with reference to the flow chart of FIG. 4.

Steps S201 to S205 show the operation of Embodiment 2 before the calculation of a motor rotation speed estimation value west and the same as those of Embodiment 1 as described above.

Step S206 shows the operation of the speed control unit 1a for calculating a speed compensation current Ivel from a motor rotation speed estimation value west and storing it in a memory. Step S207 shows the operation of the differentiator 1d for differentiating the motor rotation speed estimation value west to obtain a motor rotation acceleration estimation value dwest. Step S208 shows the operation of the acceleration control unit 1e for calculating an acceleration compensation current Iacc from the motor rotation speed acceleration estimation value dwest and storing it in the memory. Steps S209 and S210 show the operation of the steering torque control unit 1b. The torque control unit 1b reads the output Tsns of the steering torque detection means 7 in step S209 and calculates a torque compensation current Itrq from the output Tsns of the steering torque detection means 7 and stores it in the memory in step S210. In step S211, the speed compensation current Ivel, the acceleration compensation current Iacc and the torque compensation current Itrq are read and added to obtain a target current Iref and the target current Iref is stored in the memory. The above steps S201 to S211 are repeated each time sampling is made.

In this Embodiment 2, since the acceleration compensation current Iacc is calculated based on the highly accurate motor rotation acceleration estimation value dwest which is obtained by differentiating the accurate rotation speed estimation value west obtained by compensating for the influence of a voltage drop Vbr between the brush and the commutator, inertia control is also possible and much higher controllability can be obtained than when only the motor rotation speed estimation value west is used as a control signal.

While the rotation acceleration estimation value dwest is obtained using the differentiator 1d in this Embodiment 2, the rotation acceleration estimate value dwest may be obtained by pseudo-differentiation by a high-pass filter or band-pass filter.

In both Embodiment 1 and Embodiment 2, the control unit 1a, torque control unit 1b and acceleration control unit 1e of the control unit 1 may be any control units formed of a gain circuit, filter-gain circuit and phase compensator+gain circuit, PID and the like.

Embodiment 3

A description is subsequently given of Embodiment 3 of the present invention.

Embodiment 3 is the same as Embodiments 1 and 2 except an algorithm in the voltage correcting unit 5b of the voltage detection means 5.

Figure 5:
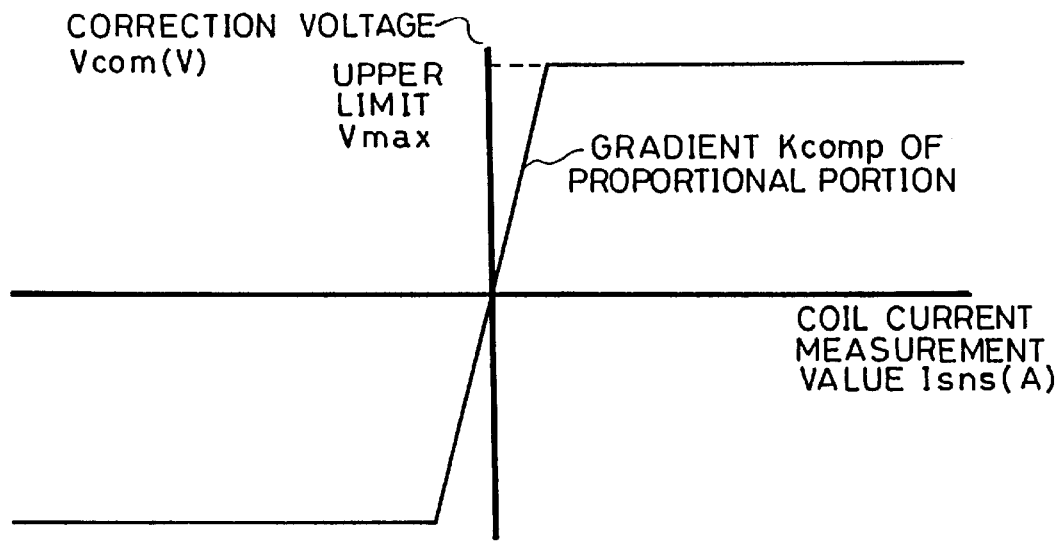
FIG. 5 is a diagram showing the characteristics of a correction voltage in Embodiment 3.

In Embodiments 1 and 2, a correction voltage Vcomp for a coil current measurement value Isns is obtained with reference to a table prestored in the ROM. In Embodiment 3, the correction voltage Vcomp is proportional to the coil current measurement value Isns and has an upper limit as shown in FIG. 5. The correction voltage Vcomp is a function whose upper limit value is the maximum voltage drop value between the brush and commutator of the motor 3 or a value obtained by multiplying it by a coefficient smaller than 1 and which is substantially proportional to the output of the current detection means 4 below the upper limit value and saturated at the upper limit value to become constant.

An algorithm for calculating a correction voltage Vcomp is described with reference to the flow chart of FIG. 6.

The algorithm for obtaining a correction voltage Vcomp with reference to the table corresponds to steps S101 and S102 of Embodiment 1 and step S201 and S202 of Embodiment 2, and other algorithms are the same.

Figure 6:
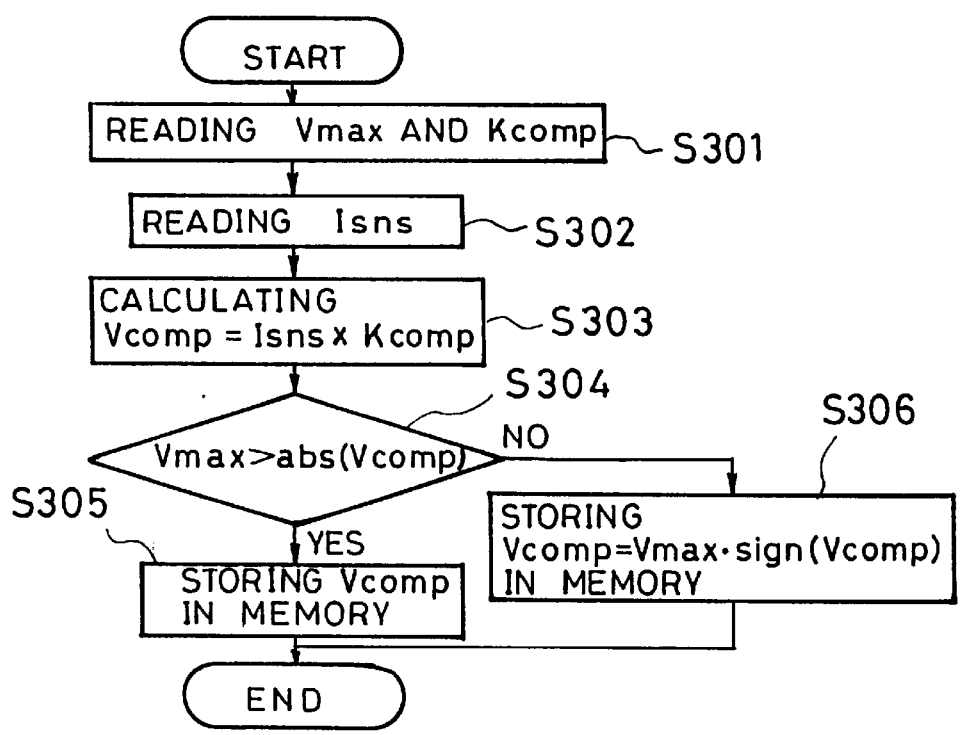
FIG. 6 is a flow chart showing calculation algorithms in Embodiment 3.

In step S301 of FIG. 6, a correction voltage gain Kcomp and the upper limit value Vmax of correction voltage equivalent to the maximum voltage drop value between the brush and the commutator stored in the ROM are first read. Then, a coil current measurement value Isns is read in step S302 and a correction voltage Vcomp is calculated based on the equation (9) in step S303.

$$V\text{comp} = I\text{sns} \times K\text{comp} \qquad (9)$$

The absolute value of the correction voltage Vcomp is compared with the upper limit value Vmax of correction voltage in the subsequent step S304. When the upper limit value Vmax of correction voltage is larger than Vcomp, Vcomp is stored in the memory to complete the calculation of the correction voltage Vcomp in step S305. When the upper limit value Vmax of correction voltage is smaller, a value obtained from the equation (10) is stored in the memory in step S306 to complete the calculation of the correction voltage Vcomp.

$$V\text{comp} = V\text{max} \cdot \text{sign}(V\text{comp}) \qquad (10)$$

While a table for obtaining a correction voltage Vcomp must be stored in the ROM in Embodiments 1 and 2, only two constants (the upper limit value Vmax and the proportional gain Kcomp) need to be stored in the ROM in Embodiment 3 because the correction voltage Vcomp is proportional to the proportional gain Kcomp and has a upper limit value Vmax in this Embodiment 3. Therefore, the volume of data to be stored in the ROM can be reduced.

Embodiment 4

A description is subsequently given of Embodiment 4 of the present invention.

Embodiment 4 is also the same as Embodiments 1 and 2 in configuration except an algorithm in the voltage correcting unit 5b of the voltage detection means 5.

Figure 7:
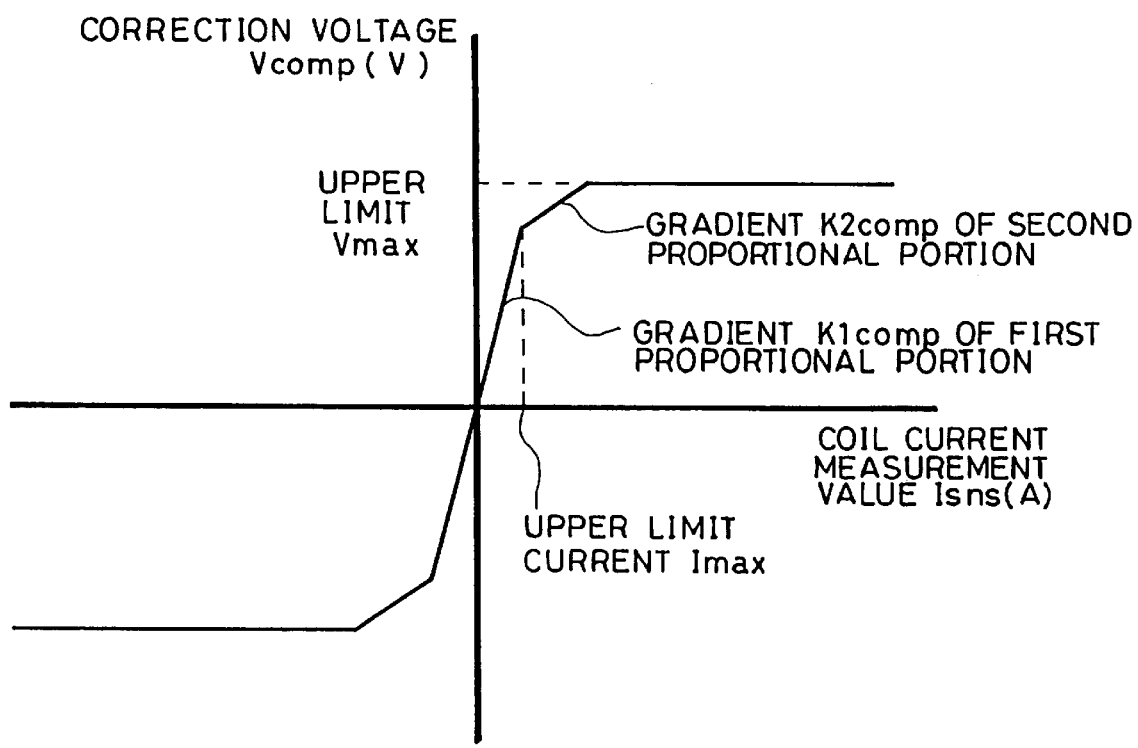
FIG. 7 is a diagram showing the characteristics of a correction voltage in Embodiment 4.

While the correction voltage Vcomp is proportional and has an upper limit value Vmax as shown in FIG. 5 in Embodiment 3, the proportional gain of a proportional portion changes in two stages (first proportional portion and second proportional portion) as shown in FIG. 7 in Embodiment 4.

Figure 8:
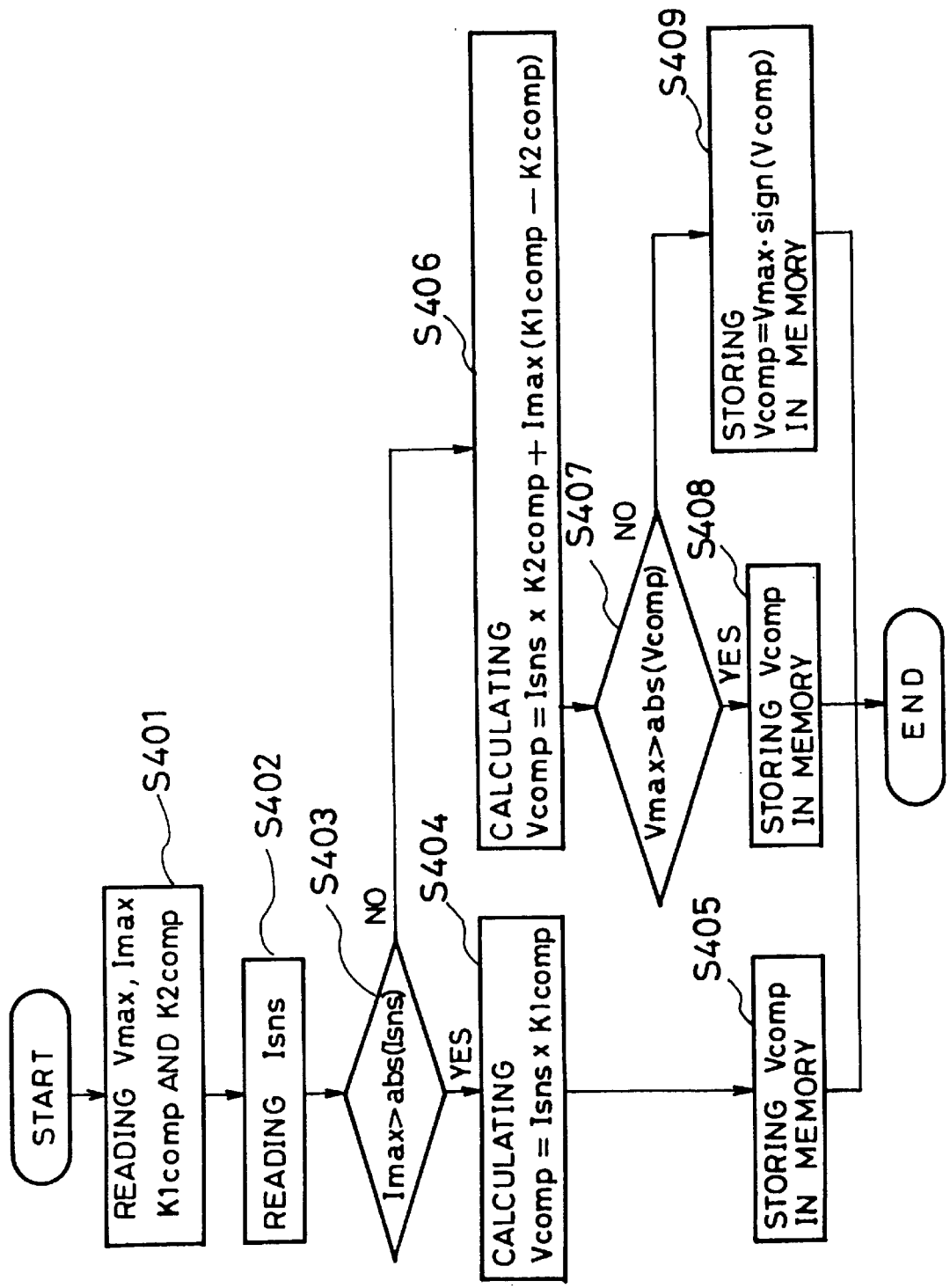
FIG. 8 is a flow chart showing calculation algorithms in Embodiment 4.

An algorithm for calculating a correction voltage Vcomp is described with reference to the flow chart of FIG. 8.

This algorithm corresponds to step S102 in Embodiment 1 and step S202 in Embodiment 2 like Embodiment 3, and other algorithms are the same.

In step S401, a first correction voltage gain K1comp, second correction voltage gain K2comp, upper limit current Imax and upper limit value Vmax of correction voltage all of which are stored in the ROM are first read. A coil current measurement value Isns is read in the subsequent step S402 and the absolute value of a coil current measurement value Isns is compared with the upper limit current Imax in step S403. When the upper limit current Imax is larger than the absolute value, the calculation of the equation (11) is carried out in step S404 and the calculation value is stored in the memory in step S405 to complete the calculation of the correction voltage Vcomp.

$$V\text{comp} = I\text{sns} \times K1\text{comp} \qquad (11)$$

When the upper limit current Imax is smaller, the correction voltage Vcomp is calculated based on the following equation (12) in step S406.

$$V\text{comp} = I\text{sns} \times K2\text{comp} + I\text{max}(K1\text{comp} - K2\text{comp}) \qquad (12)$$

In the subsequent step S407, the absolute value of correction voltage Vcomp is compared with the upper limit value Vmax of correction voltage. When the upper limit value Vmax of correction voltage is larger, the correction voltage Vcomp is stored in the memory in step S408 to complete the calculation of the correction voltage Vcomp. When the upper limit value Vmax of correction voltage is smaller, a value obtained from the above equation (10) is stored in the memory in step S409 to complete the calculation of the correction voltage Vcomp.

Since the correction voltage Vcomp is such that the proportional gain of the proportional portion changes in two stages in this Embodiment 4, it is possible to approximate the correction voltage Vcomp to voltage drop characteristics between the brush and the commutator more than Embodiment 3, thereby obtaining a more accurate motor rotation speed estimation value west.

In Embodiment 4, the correction voltage Vcomp is such that the proportional gain of the proportional portion changes in two stages. However, it may change in three or more stages.

Embodiment 5

A description is subsequently given of Embodiment 5 of the present invention. This Embodiment 5 is also the same as Embodiments 1 and 2 in configuration except an algorithm in the voltage correcting unit 5b.

Figure 9:
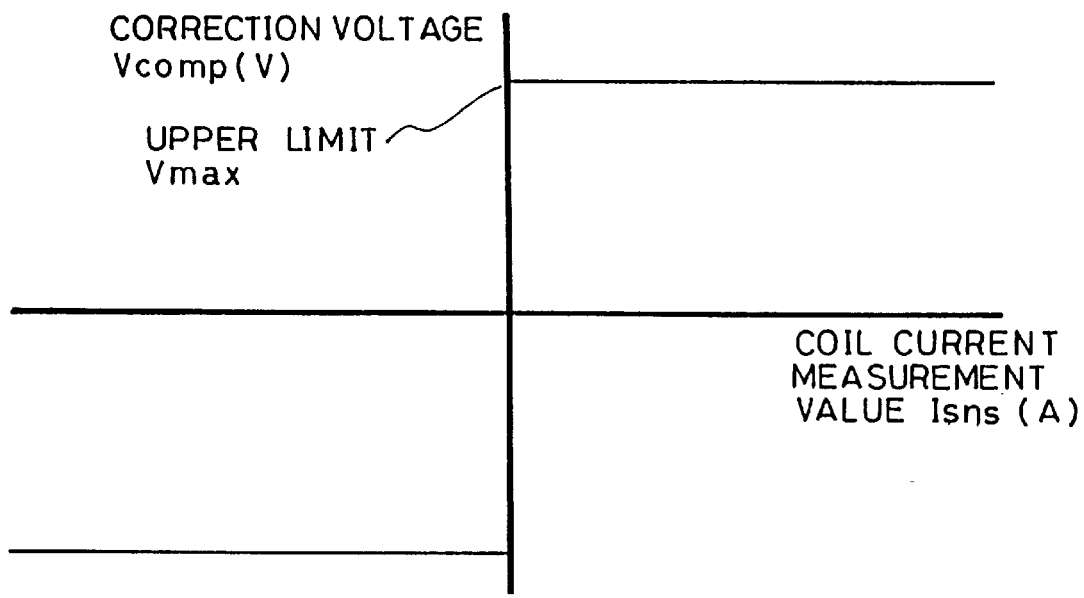
FIG. 9 is a diagram showing the characteristics of a correction voltage in Embodiment 5.

While the correction voltage Vcomp is proportional to the coil current measurement value Isns and has an upper limit value Vmax in Embodiments 3 and 4, the correction voltage Vcomp is output by a relay circuit whose amplitude for switching its sign according to the coil current measurement value Isns is the upper limit value Vmax as shown in FIG. 9. The correction voltage Vcomp is output by the relay circuit which is switched only by the sign of the output of the current detection means 4 and the amplitude the relay circuit is the maximum voltage drop value between the brush and the commutator or a value obtained by multiplying it by a coefficient smaller than 1.

Figure 10:
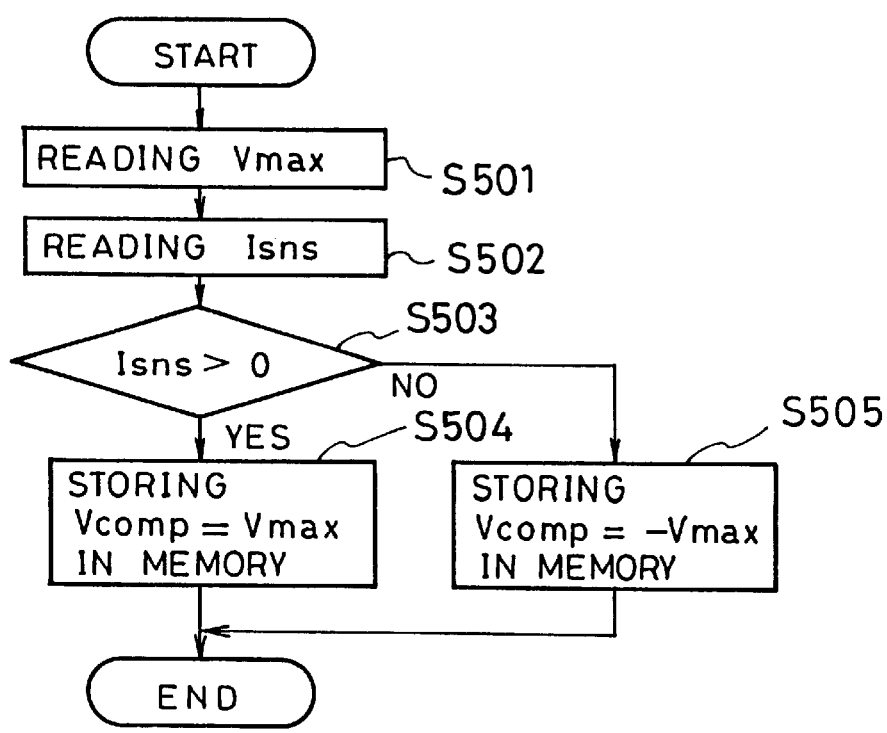
FIG. 10 is a flow chart showing calculation algorithms in Embodiment 5.

An algorithm for calculating a correction voltage Vcomp is described with reference to the flow chart of FIG. 10.

This algorithm corresponds to step S102 in Embodiment 1 and step S202 in Embodiment 2, and other algorithms are the same.

The maximum value Vmax of correction voltage stored in the ROM is first read in step S501. Then, a coil current measurement value Isns is read in step S502 and whether the coil current measurement value Isns is positive or negative is judged in step S503. When the coil current measurement value Isns is positive, Vcomp=Vmax is stored in the memory in step S504 to complete the calculation of the correction voltage Vcomp. When the coil current measurement value Isns is negative, Vcomp=−Vmax is stored in the memory in step S505 to complete the calculation of the correction voltage Vcomp.

Since the correction voltage Vcomp is output by the relay circuit whose amplitude for the coil current measurement value Isns is Vmax in Embodiment 5, an addition operation as required in Embodiments 3 and 4 is eliminated, thereby increasing the processing speed of algorithms.

In Embodiment 5, the correction voltage V is made free from proportional portions and output by the relay circuit whose amplitude for the coil current measurement value Isns is Vmax. However, there may be a dead zone in which the correction voltage Vcomp is set to "0" within the range of the coil current measurement value Isns corresponding to the proportional portion. Alternatively, the correction voltage Vcomp may be set to "0" only when the sign of the coil application estimation value Va_est calculated based on the above-described equation (7) is different from the sign of the inter-terminal voltage measurement value Vt_sns. Alternatively, not the correction voltage but the coil application voltage estimation value Va_est may be set to "0".

Embodiment 6

A description is subsequently given of Embodiment 6 of the present invention.

This Embodiment 6 is the same as Embodiments 1 and 2 in configuration except an algorithm in the voltage correcting unit 5b of the voltage detection means 5.

Figure 11:
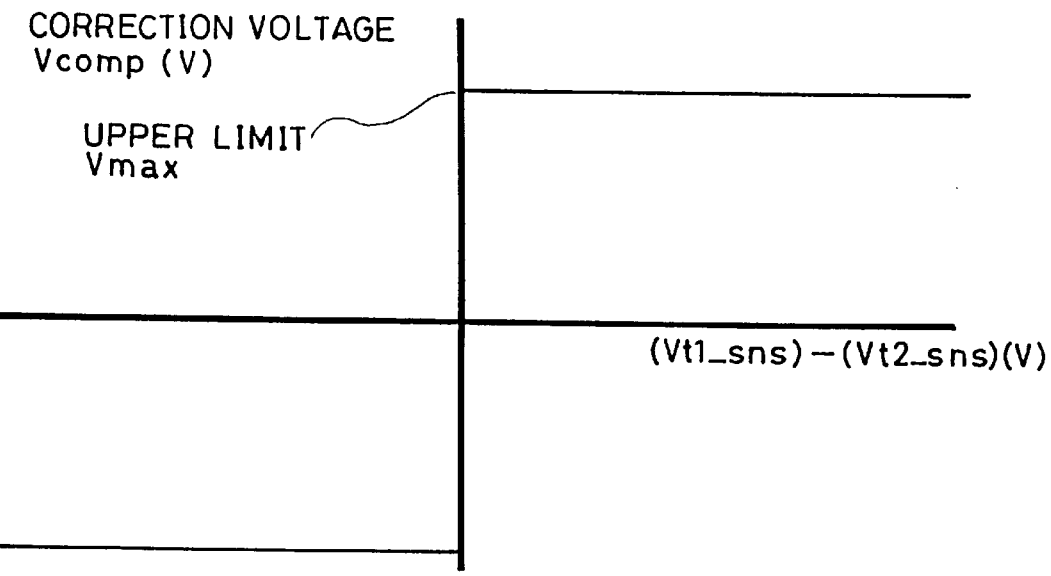
FIG. 11 is a diagram showing the characteristics of a correction voltage in Embodiment 6.

While the relay is switched according to the coil current measurement value Isns to determine the correction voltage Vcomp in Embodiment 5, the relay circuit is switched by the sign of the difference of voltage between both terminals of the motor 3 as shown in FIG. 11 in Embodiment 6. That is, in Embodiment 6, a correction voltage obtained by the voltage detection means 5 is output by the relay circuit which is switched only by the sign of the difference between the terminal voltage measurement values of a double-phase motor, and the amplitude of the relay circuit is the maximum voltage drop value between the brush and commutator of the motor 3 or a value obtained by multiplying it by a coefficient smaller than 1.

Figure 12:
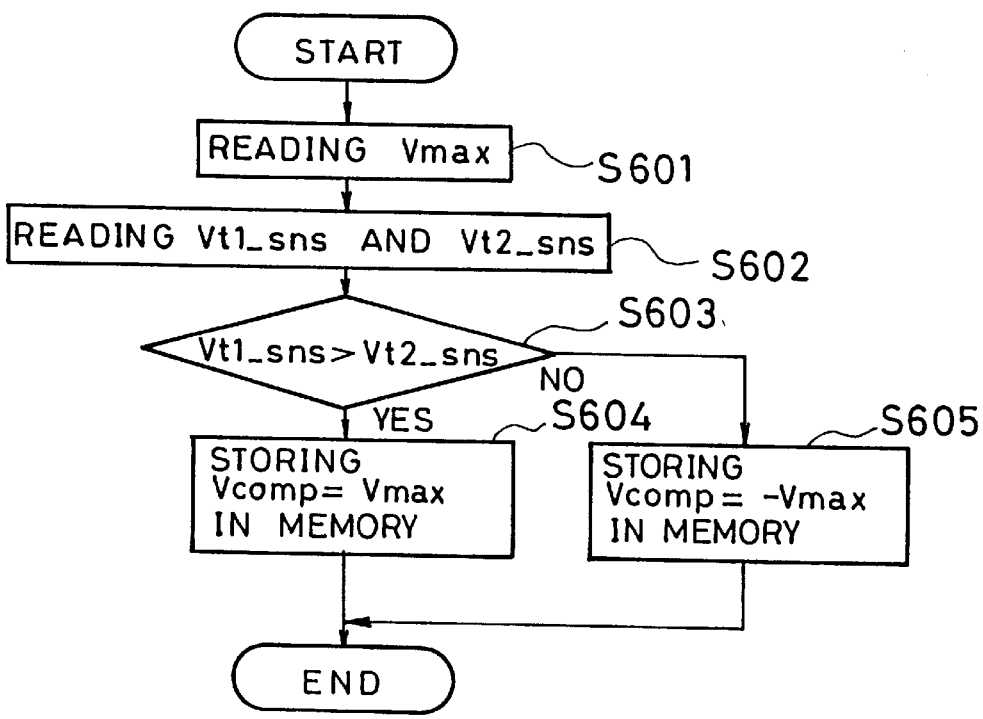
FIG. 12 is a flow chart showing calculation algorithms in Embodiment 6.

An algorithm for calculating the correction voltage Vcomp is described with reference to the flow chart of FIG. 12.

This algorithm corresponds to step S102 in Embodiment 1 and to step S202 in Embodiment 2 for the calculation of a correction voltage Vcomp with reference to the table, and other algorithms are the same.

In step S601, the maximum value Vmax of correction voltage stored in the ROM is first read. In the subsequent step S602, voltage measurement values Vt1_sns and Vt2_sns at both terminals of the motor are read. In step S603, the voltage measurement value Vt1_sns is compared with the voltage measurement value Vt2_sns. When Vt1_sns is larger, Vcomp=Vmax is stored in the memory in step S604 to complete the calculation of the correction voltage Vcomp. When Vt1_sns is smaller, Vcomp=−Vmax is stored in the memory in step S605 to complete the calculation of the correction voltage Vcomp. The voltage difference between both terminals of the motor and the direction of the coil current generally agree with each other.

Since the relay circuit is switched based on the voltage measurement values Vt1_sns and Vt2_sns at both terminals of the motor in Embodiment 6, the relay circuit can be switched accurately even when the coil current measurement value Isns is offset by temperature characteristics or the like and its origin is shifted.

It is needless to say that there may be a dead zone near the origin of the relay circuit shown in FIG. 11 in Embodiment 6 like Embodiment 5.

Like Embodiment 1, the minimum voltage drop value between the brush and the commutator may be stored in the ROM in place of voltage drop values between the brush and the commutator in consideration of errors and time changes of the motor in Embodiments 3 to 6.

Embodiment 7

Figure 13:
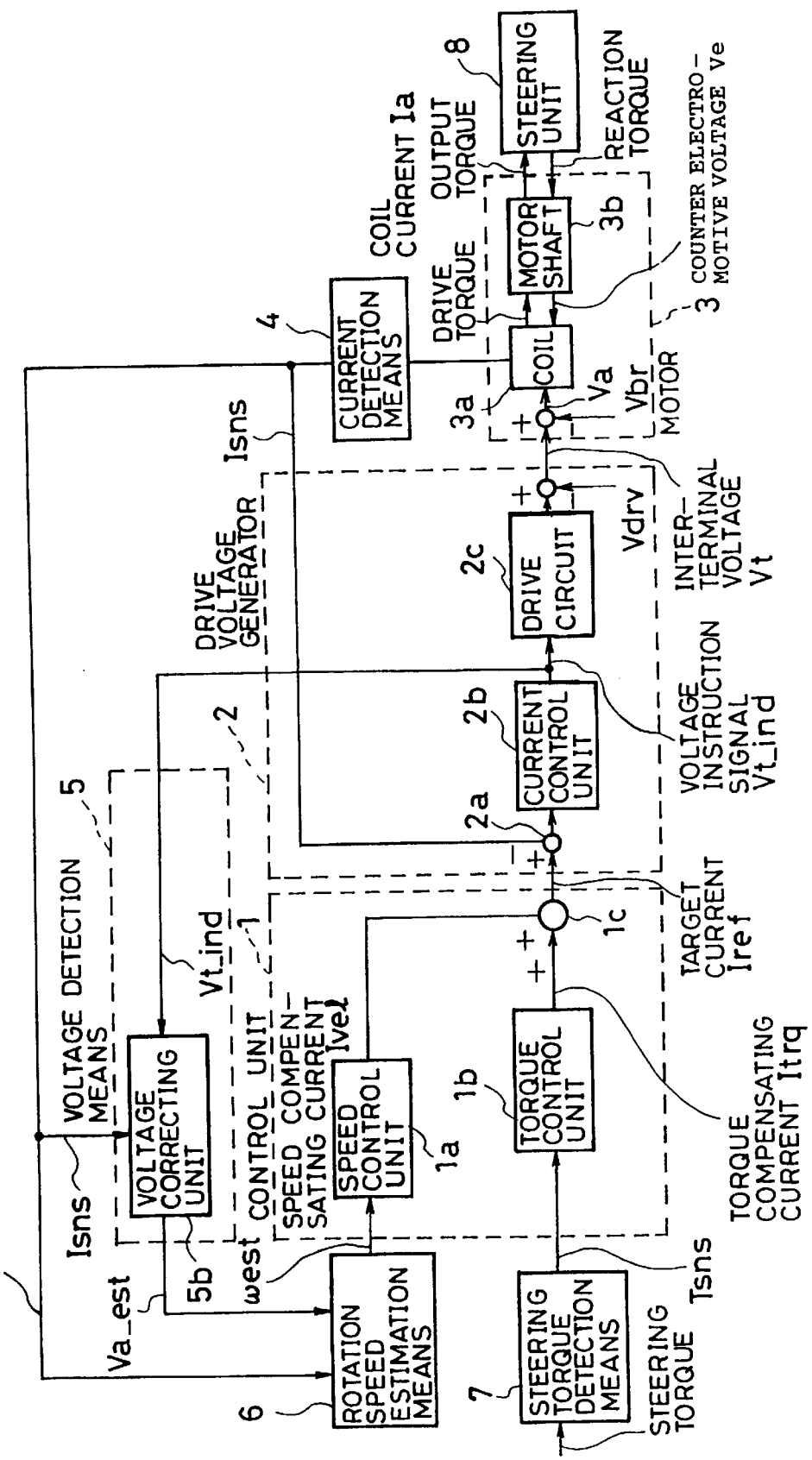
FIG. 13 is a block diagram of an electric power steering controller according to Embodiment 7 of the present invention.

A description is subsequently given of Embodiment 7 of the present invention with reference of FIG. 13.

Embodiment 7 is the same as Embodiments 1 and 2 in configuration except the voltage detection means 5, and descriptions of other elements are omitted. In FIG. 13, reference numeral 5 denotes voltage detection means which comprises only a voltage correcting unit 5b for correcting a voltage instruction signal Vt_ind from the current control unit 2b based on a coil current measurement value Isns from the current detection means 4 and for estimating an application voltage Va to the coil. That is, the voltage detection means 5 subtracts a correction voltage equivalent to a voltage drop value between the brush and commutator of the motor 3 and a voltage drop value caused by the drive circuit 2c from a voltage instruction signal Vt_ind instructed by the current control unit 2b.

Figure 14:
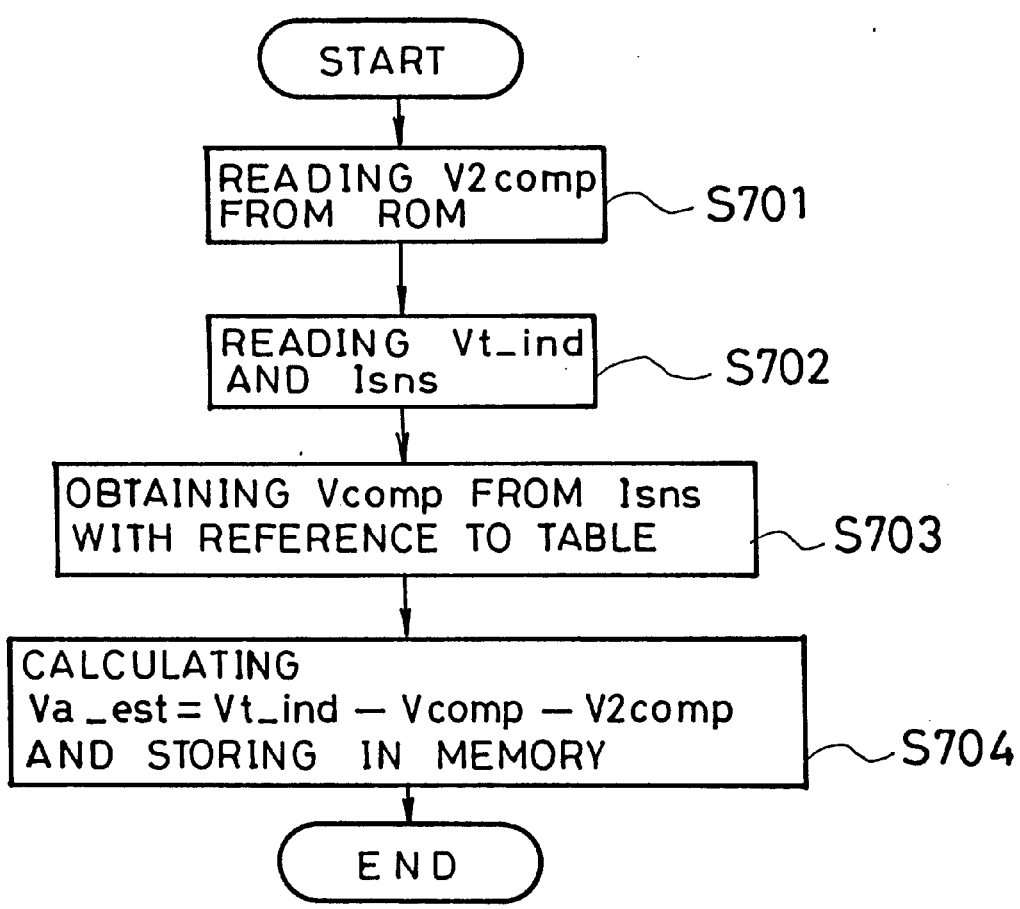
FIG. 14 is a flow chart showing calculation algorithms in Embodiment 7.

An algorithm for calculating an application voltage estimation value Va_est to the coil is described with reference to the flow chart of FIG. 14.

Since this Embodiment 7 differs from Embodiments 1 and 2 only in the voltage detection means 5, only an algorithm for obtaining an application voltage estimation value Va_est to the coil 3a by means of the voltage correcting unit 5b is described herein.

In step S701, a circuit correction voltage V2comp equivalent to a voltage drop Vdrv caused by the drive circuit 2c which is stored in the ROM is read. In the subsequent step S702, a voltage instruction signal Vt_ind and a coil current measurement value Isns are read. In step S703, a correction voltage Vcomp for the coil current measurement value Isns is obtained with reference to the table of voltage drop characteristics between the brush and the commutator stored in the ROM. Thereafter, in step S704, an application voltage estimation value Va_est to the coil 3a is calculated based on the following equation (13) and stored in the memory.

$$Va\_est = Vt\_ind - Vcomp - V2comp \qquad (13)$$

Since the application voltage estimation value Va_est to the coil is obtained by subtracting a correction voltage Vcomp equivalent to a voltage drop between the brush and the commutator and a circuit correction voltage V2comp equivalent to a voltage drop Vdrv caused by the drive circuit 2c from a voltage instruction signal Vt_ind in Embodiment 7, it is not necessary to measure an inter-terminal voltage Vt, thereby eliminating the influence of an offset of the inter-terminal voltage measurement value Vt_sns caused by temperature characteristics and the like.

When the voltage drop caused by the drive circuit 2c is small, the circuit correction voltage V2comp may be set to "0".

Embodiment 8

Figure 15:
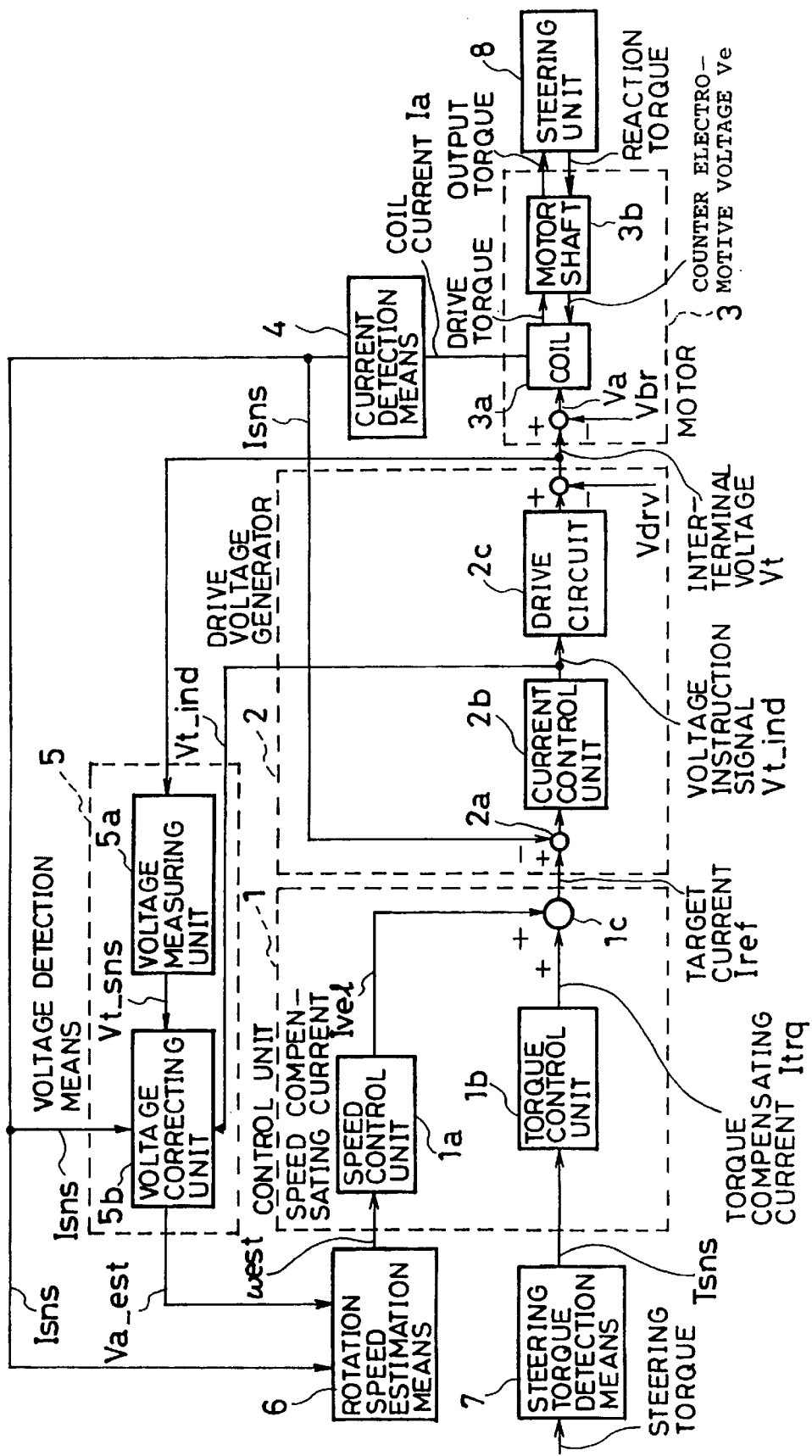
FIG. 15 is a block diagram of an electric power steering controller according to Embodiment 8 of the present invention.

A description is subsequently given of Embodiment 8 of the present invention with reference to FIG. 15.

Embodiment 8 is the same as Embodiments 1 and 2 in configuration except the voltage detection means 5, and descriptions of other elements are omitted.

Reference numeral 5 denotes voltage detection means which comprises a voltage measuring unit 5a for measuring the inter-terminal voltage Vt of the motor 3 and a voltage correcting unit 5b for estimating an application voltage Va to the coil 3a by correcting an inter-terminal voltage measurement value Vt_sns and a voltage instruction signal Vt_ind from the current control unit 2b based on a coil current measurement value Isns from the current detection means 4 and weight averaging these corrected values. In other words, the voltage detection means 5 obtains an application voltage estimation value by weight averaging a first detection voltage obtained by subtracting a correction voltage Vcomp equivalent to a voltage drop between the brush and commutator of the motor 3 from an inter-terminal voltage measurement value Vt_sns of the motor 3 and a second detection voltage obtained by subtracting a correction voltage Vcomp equivalent to a voltage drop between the brush and commutator of the motor 3 and a circuit correction voltage V2comp equivalent to a voltage drop caused by the drive circuit 2c for driving motor 3 from a voltage instruction signal Vt_ind instructed by the current control unit 2b. The voltage detection means 5 changes the weights of the first detection voltage and the second detection voltage based on the hysteresis of the output of the current detection means 4. When a large current is not detected, the weight of the first detection voltage is made large and when a large current is detected, the weight of the second detection voltage is made large.

Figure 16:
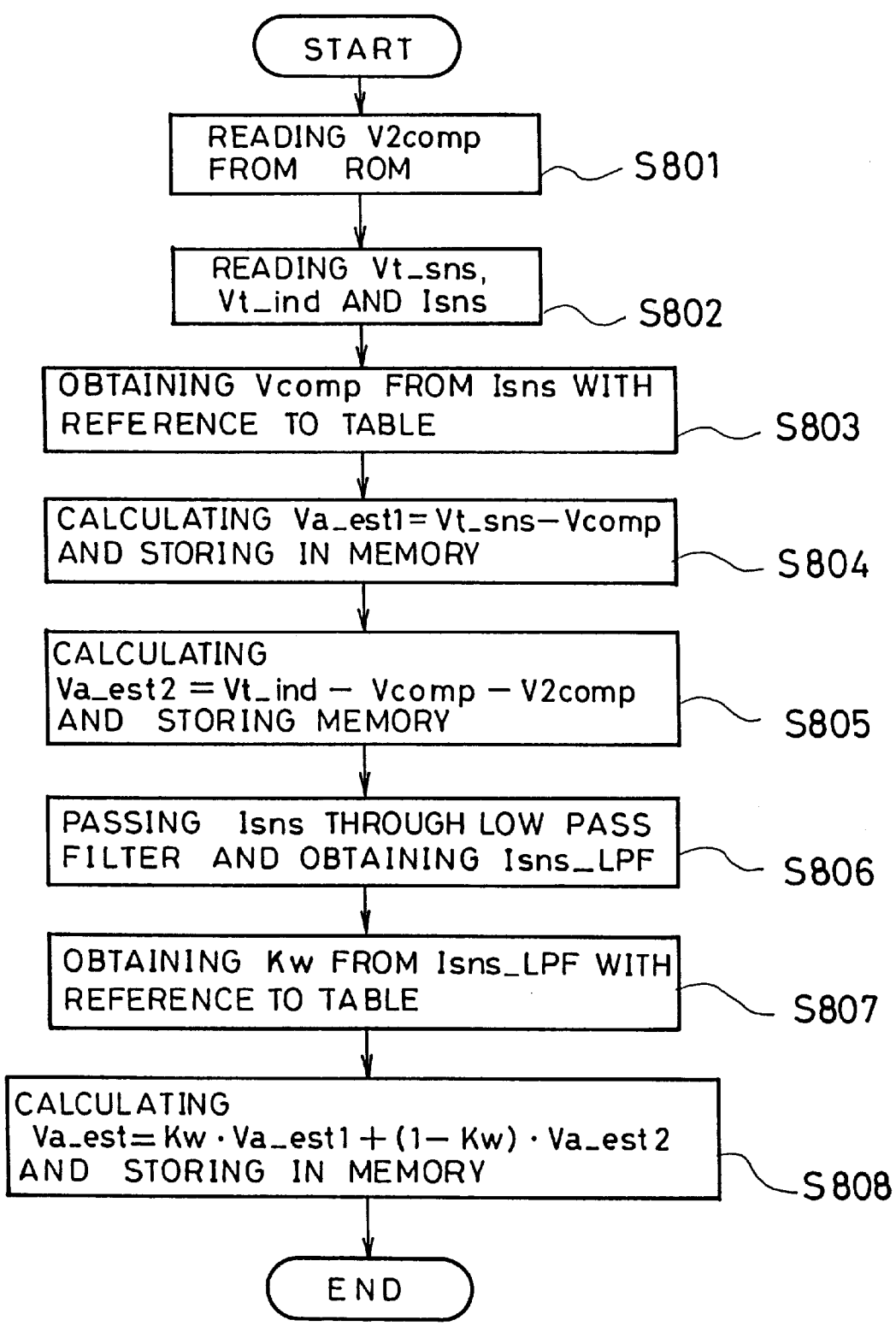
FIG. 16 is a flow chart showing calculation algorithms in Embodiment 8.

An algorithm for calculating an application voltage estimation value Va_est to the coil 3a is described with reference to the flow chart of FIG. 16.

Since Embodiment 8 differs from Embodiments 1 and 2 in the voltage detection means 5 only, only an algorithm for obtaining an application voltage estimation value Va_est to the coil 3a by means of the voltage correcting unit 5b is described.

In step S801, a circuit correction voltage V2comp equivalent to a voltage drop Vdrv caused by the drive circuit 3c stored in the ROM is first read. In the subsequent step S802, an inter-terminal voltage measurement value Vt_sns, voltage instruction signal Vt_ind and coil current measurement value Isns are read. In the next step S803, a correction voltage Vcomp for the coil current measurement value Isns is obtained with reference to the table of voltage drop characteristics between the brush and the commutator pre-stored in the ROM. In step S804, a first application voltage estimation value Va_est1 to the coil 3a is obtained from the following equation (14). In the next step S805, a second application voltage estimation value Va_est2 to the coil 3a is obtained from the following equation (15) and stored in the memory.

$$Va\_est1 = Vt\_sns - Vcomp \tag{14}$$

$$Va\_est2 = Vt\_ind - Vcomp - V2comp \tag{15}$$

In the following step S806, the coil current measurement value Isns is let passing through the low pass filter to obtain Isns_LPF. In the next step S807, a weighted average coefficient Kw of the application voltage estimation value Va_est1 and the application voltage estimation value Va_est2 is obtained from Isns_LPF with reference to the table. In step S808, an application voltage estimation value Va_est to the coil 3a is estimated from the weighted average based on the following equation (16) and stored in the memory.

$$Va\_est = Kw \cdot Va\_est1 + (1-Kw) \cdot Va\_est2 \tag{16}$$

The weighted average coefficient Kw is set to a value of 0 to 1. When Isns_LDP is small, it is set to a value approximate to "1" and when Isns_LDP is large, it is set to a value approximate to "0" and stored in the ROM as a table value. If it is set to a value approximate to "1" when the output Isns_LPF is small and to a value approximate to "0" when the output Isns_LPF is large, it may be calculated with a linear function or the like and not stored as a table value.

It is known that a measurement error between an inter-terminal voltage measurement value Vt_sns and a true value becomes larger as the motor temperature increases. It is needless to say that the application voltage estimation value Va_est to the coil 3a is more accurate when it is estimated from an inter-terminal voltage measurement value Vt_sns than from a voltage instruction signal Vt_ind when the measurement error is small. The main factor of increasing the motor temperature is heat generated therefrom which occurs when a large current is applied to the motor. The temperature begins to rise or fall with a time lag behind a current value.

According to Embodiment 8, the coil current measurement value Isns is obtained through the low pass filter as a signal Isns_LPF indicative of a rough temperature and a weighted average coefficient Kw temperature for calculating a weighted average of an application voltage estimation value Va_est1 estimated from an inter-terminal voltage measurement value Vt_sns and an application voltage estimation value Va_est2 estimated from a voltage instruction signal Vt_ind is changed by a signal Isns_LPF indicative of a rough temperature to estimate an application voltage estimation value Va_est to the coil 3a and a rotation speed estimation value west with high accuracy regardless of the heat generation condition of the motor.

Embodiment 9

Figure 17:
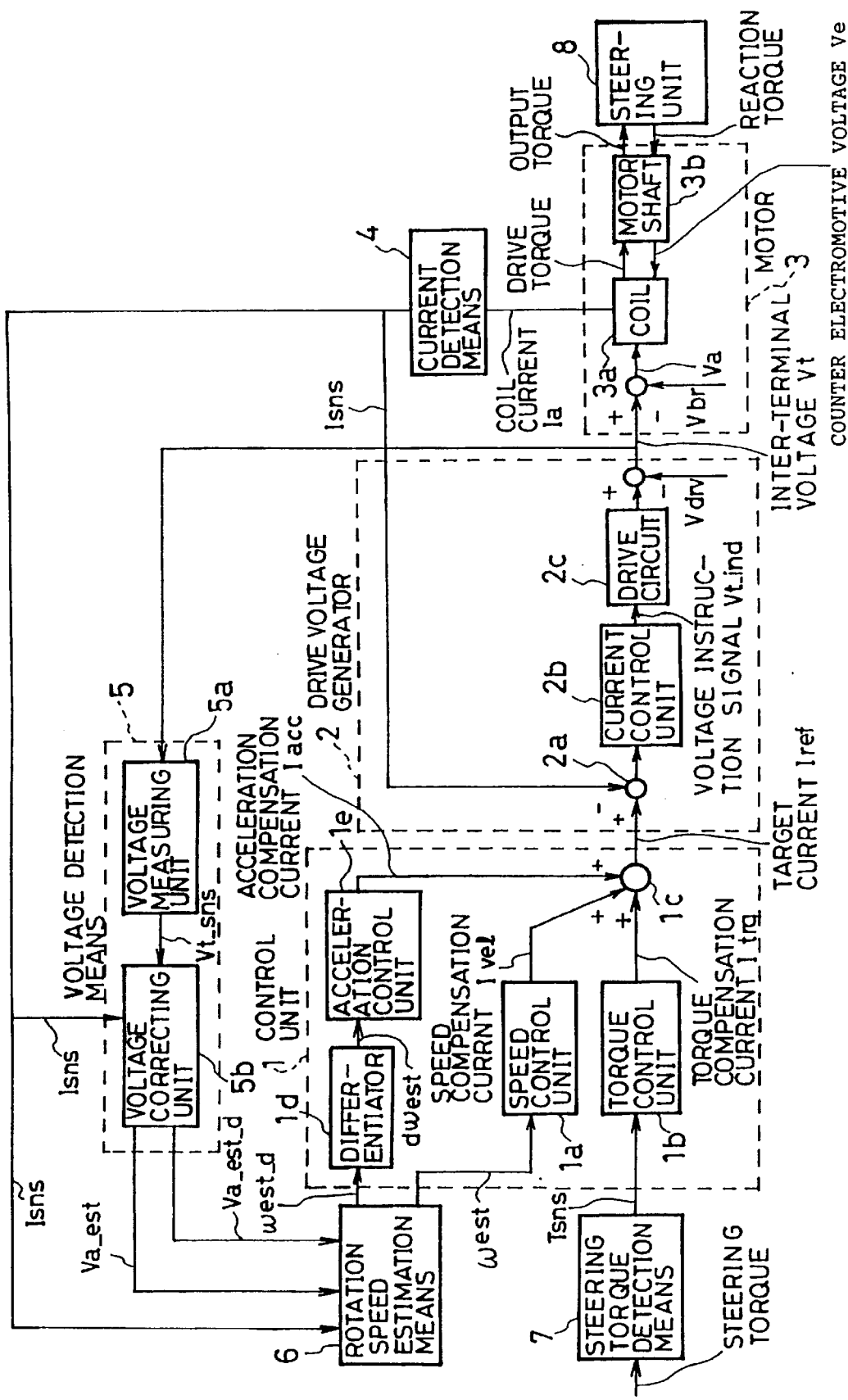
FIG. 17 is a block diagram showing the constitution of Embodiment 9.

FIG. 17 is a block diagram showing the constitution of Embodiment 9. Embodiment 9 differs from Embodiment 2 only in the operation of the voltage correction unit 5b of the voltage detection means 5. The application voltage estimation value Va_est to the coil 3a and the motor rotation speed estimation value west are both divided into two, one of which is applied to the speed control unit 1a and the other is applied to the acceleration control unit 1e.

Figure 18:
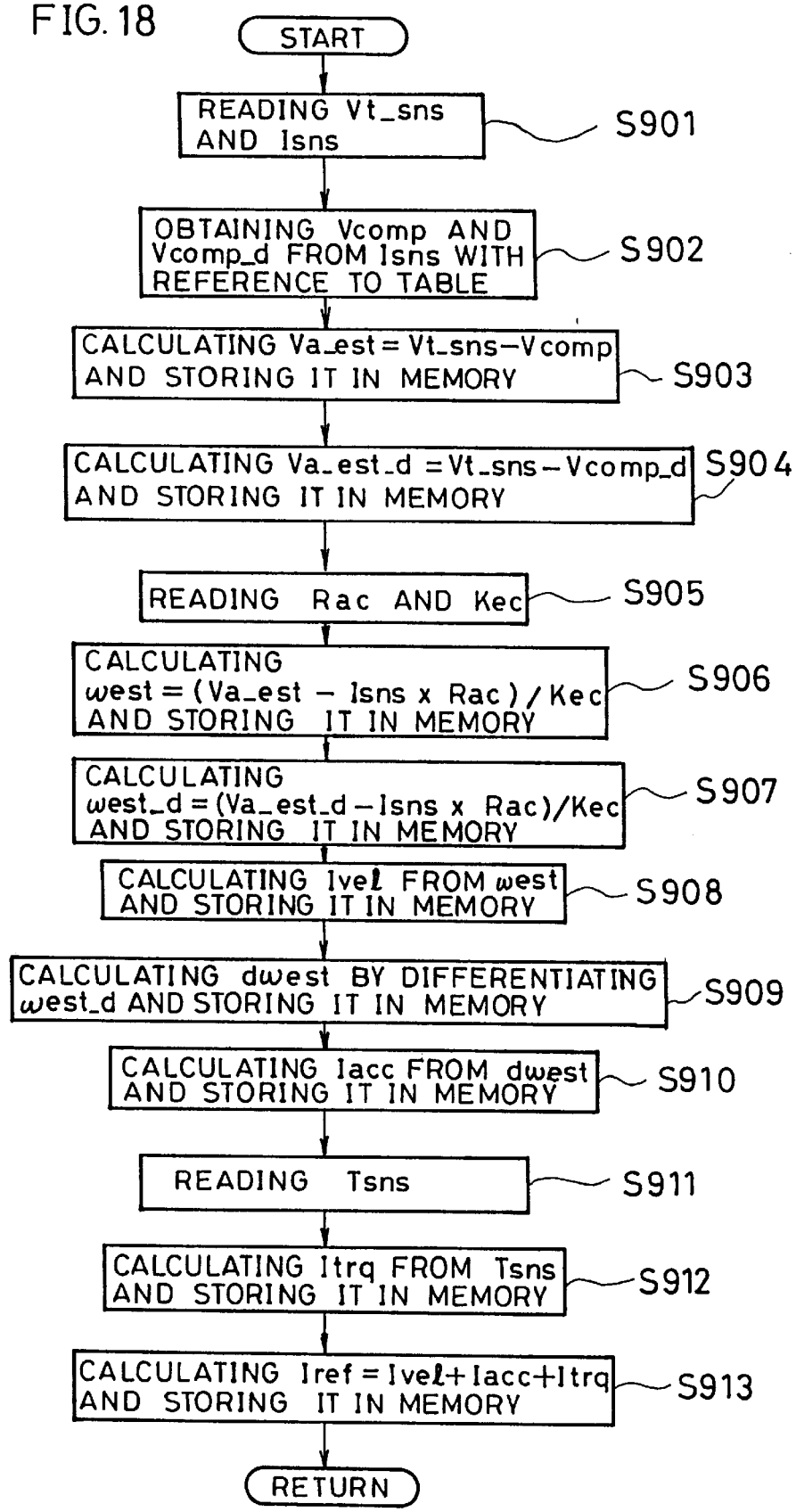
FIG. 18 is a flow chart showing the algorithms of Embodiment 9.

A description is subsequently given of the operation of this Embodiment 9 with reference to the flow chart of FIG. 18. steps S901 to S903 show the operation of the voltage correction unit 5b. In s tep S901, an inter-terminal voltage measurement value Vt_sns measured by the voltage measuring unit 5a and a coil current measurement value Isns measured by the current detection means 4 are read. In the subsequent step S902, correction voltages Vcomp and Vcomp_d for the coil current measurement value Isns are obtained with reference to voltage drop characteristics between the brush and the commutator prestored in the ROM. Vcom_d is set to a value larger than Vcomp in the ROM. In the following steps S903 and S904, application voltage estimation values Va_est and Va_est_d to the coil 3a are calculated based on the following equations (17) and (18).

$$Va\_est = Vt\_sns - Vcomp \quad (17)$$

$$Va\_est\_d = Vt\_sns - Vcomp\_d \quad (18)$$

Steps S905 to S907 show the operation of the rotation speed estimation means. In step S905, a coil resistance equivalent value Rac and a counter electromotive voltage constant equivalent value Kec are read from the ROM. In the next steps S906 and S907, a motor rotation speed estimation value west is calculated based on the following equations (19) and (20).

$$west = (Va\_est - Isns \times Rac)/Kec \quad (19)$$

$$west\_d = (Va\_est\_d - Isns \times Rac)/Kec \quad (20)$$

Step S908 shows the operation of the speed control unit 1a for calculating a speed compensation current Ivel from the motor rotation speed estimation value west and storing it in the memory. Step S909 shows the operation of the differentiator 1d for calculating a motor rotation acceleration estimation value dwes by differentiating the motor rotation estimation value west_d. Step S910 shows the operation of the acceleration control unit 1e for calculating an acceleration compensation current Iacc from the motor rotation acceleration estimation value dwest and storing it in the memory. Steps S911 and S912 show the operation of the torque control unit 1b. In step S911, an output Tsns of the steering torque detection means is read and in the next step S912, a torque compensation current Itrq is calculated form the output Tsns of the steering torque detection means and stored in the memory. Step S913 shows the operation of the adder 1c for reading and adding he speed compensation current Ivel, the acceleration compensation current Iacc and the torque compensation current Itrq to obtain a target current Iref and storing it in the memory. The above steps S901 to S913 are repeated each time sampling is made.

In Embodiment 9, the correction voltage is divided into a first correction voltage Vcomp for obtaining the rotation speed estimation value west and a second correction voltage Vcomp_d for obtaining a differential signal for the rotation speed estimation value, and Vcomp_d is made larger than Vcomp. Therefore, even when there are variations and fluctuations in voltage drop characteristics between the brush and the commutator, it is possible to prevent damping from failing to work by a shortage of speed compensation current Iv for compensating for damping or inertia compensation from working too much by an excess of acceleration compensation current Iacc for compensating for inertia. Therefore, control stability is not impaired.

In this Embodiment, the correction voltage Vcomp for obtaining the rotation speed estimation value west is made smaller than the correction voltage Vcomp_d for obtaining the differential signal. In the case of a motor having a small voltage drop Vbr between the brush and the commutator, Vcomp may be set to "0".

Embodiment 10

Figure 19:
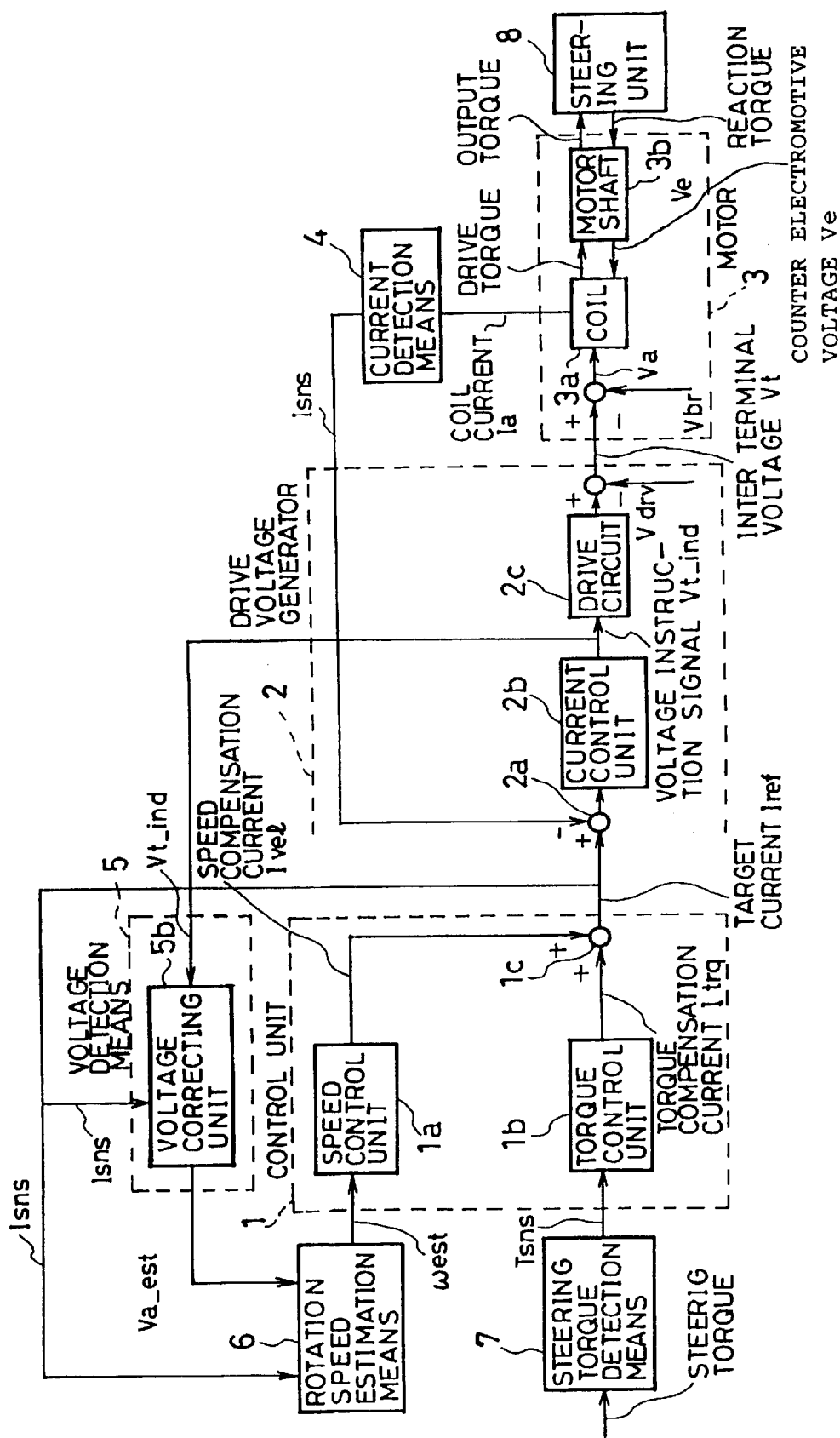
FIG. 19 is a block diagram showing the constitution of Embodiment 10.
Figure 20:
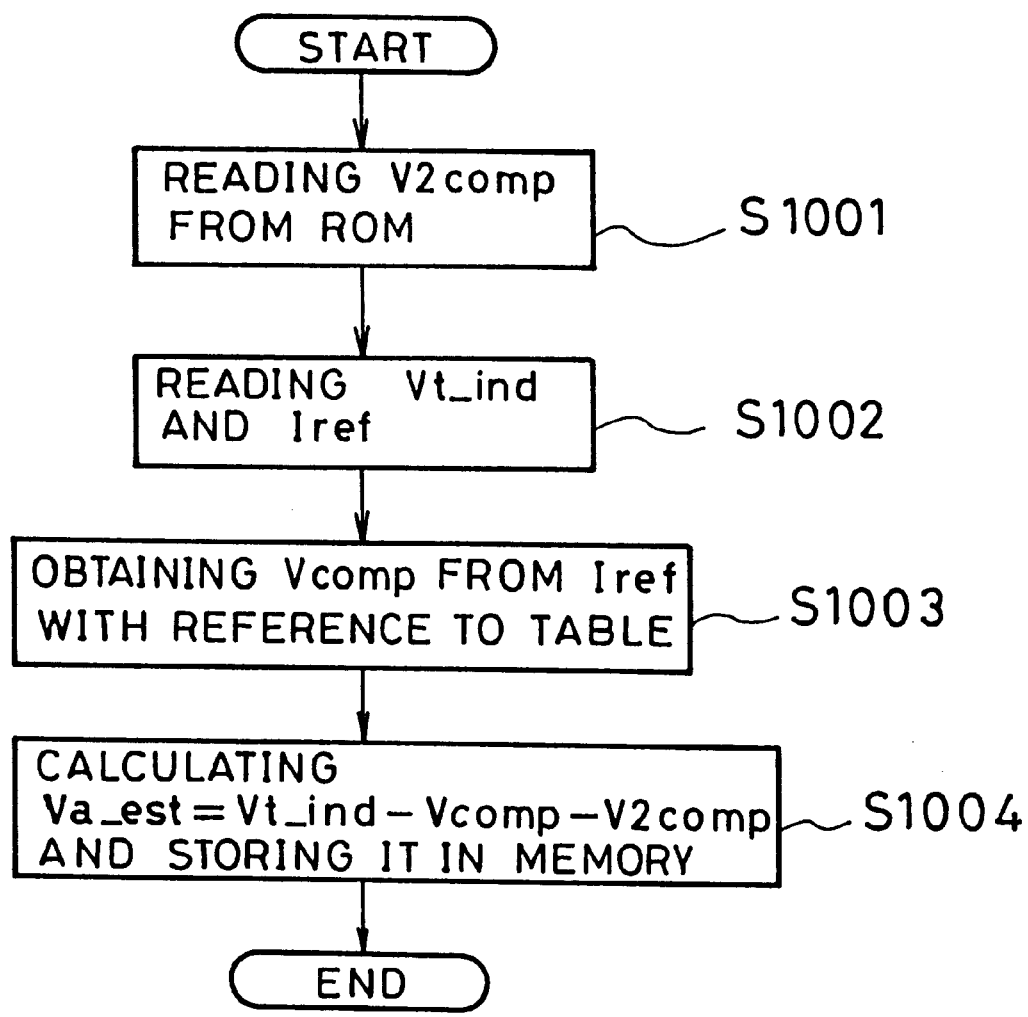
FIG. 20 is a flow chart showing the algorithms of Embodiment 10.

FIG. 19 is a block diagram showing the constitution of Embodiment 10 of the present invention and FIG. 20 is a flow chart showing the operation of Embodiment 10. In Embodiment 7, the correction voltage Vcomp is obtained based on the coil current measurement value Isns. In Embodiment 10, the correction voltage Vcomp is obtained based on the target current Iref. Embodiment 10 is completely the same as Embodiment 7 except that the coil current measurement value Isns is replaced by the target current Iref and its description is omitted.

In Embodiment 10, since the correction voltage Vcomp is obtained based on the target current Iref, noise superimposed on the coil current measurement value Isns does not affect the calculation of the correction voltage Vcomp.

In Embodiment 10, the application voltage estimation value Va_est to the coil 3a is calculated based on the voltage instruction signal Vt_ind. It is needless to say that the application voltage estimation value Va_est to the coil 3a may be calculated from the inter-terminal voltage measurement value Vt_sns or the weighted means of the inter-terminal voltage measurement value Vt_sns and the voltage instruction signal Vt_ind.

Embodiment 11

A description is subsequently given of Embodiment 11. In Embodiments 1 to 10, the voltage correction value Vcomp by which the voltage correction unit 5b corrects the inter-terminal voltage measurement value Vt_sns is fixed. Embodiment 11 may be the same as any one of Embodiments 1 to 10 in constitution except that the voltage correction value Vcomp is made variable.

Figure 21:
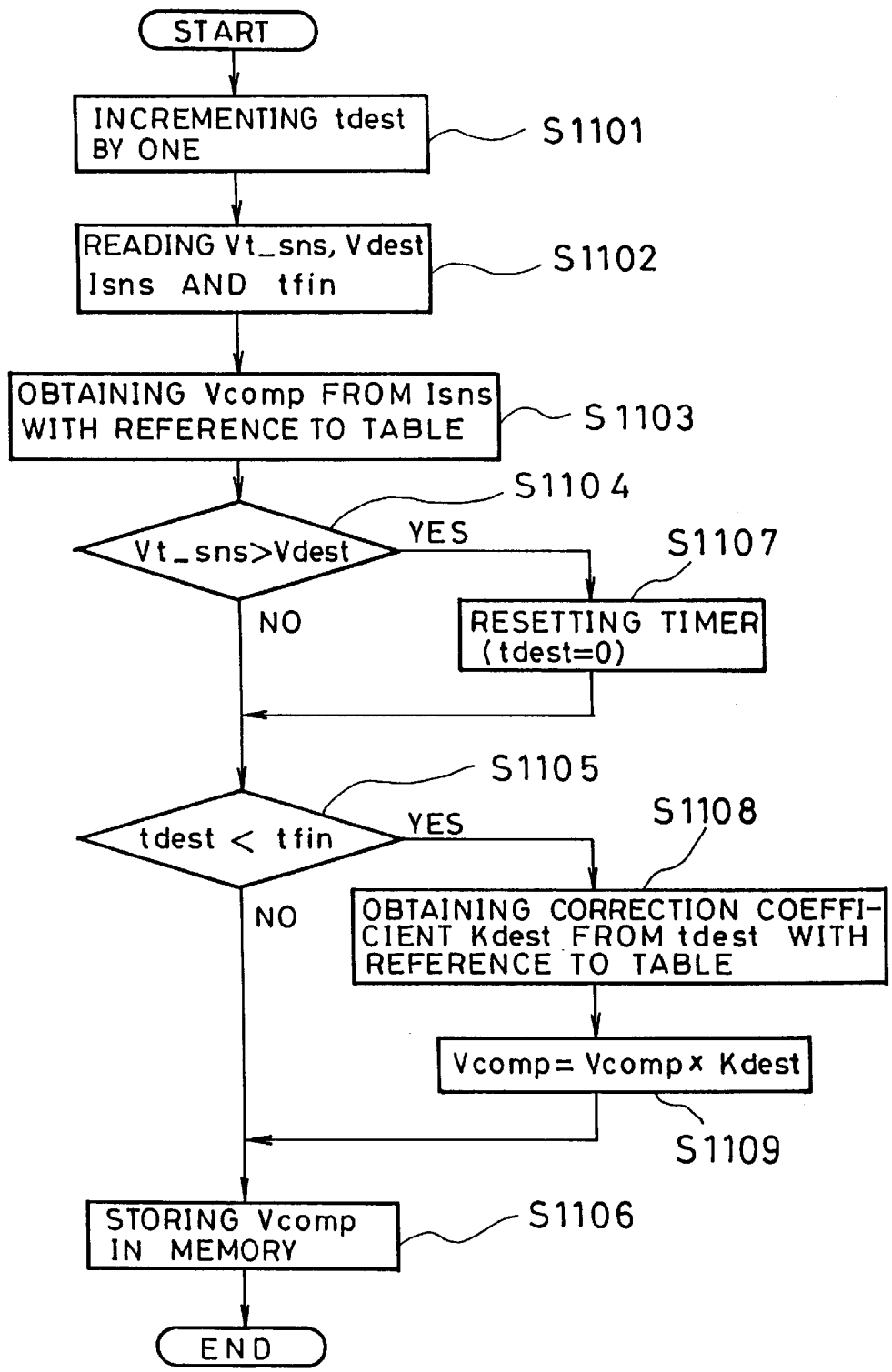
FIG. 21 is a flow chart showing the algorithms of Embodiment 11.

The operation of Embodiment 11 for determining the voltage correction value Vcomp will be described with reference to the flow chart of FIG. 21. In step S1101, the count value tdest of a software timer is incremented by one. Tdest is clipped to prevent an overflow caused by count-up. In the next step S1102, the inter-terminal voltage measurement value Vt_sns, the coil current measurement value Isns, and Vdest and tfin prestored in the ROM are read. Vdest is set to a value equal to an application voltage at which an oxide film on the commutator of the motor breaks down. Tfin is set to a value equal to a time period from the time when a voltage drop Vbr between the brush and the commutator becomes small by the breakdown to the time when the voltage drop Vbr returns to a normal voltage drop value. In the next step S1103, a correction voltage Vcomp for the coil current measurement value Isns is read from a table. In the subsequent step S1104, the inter-terminal voltage measurement value Vt_sns and Vdest are compared with each other. When the inter-terminal voltage measurement value Vt_sns is equal to or smaller than Vdest, the routine proceeds to step S1105. When the inter-terminal voltage measurement value Vt_sns is larger than Vdest, the count value tdest of the timer is reset to "0" in step S1107 and the routine proceeds to step S1105. In step S1105, tdest and tfin are compared with each other. When tdest is equal to or larger than tfin, the routine proceeds to step S1106 to store Vcomp obtained in step S1103 in the memory, thereby completing the processing of determining Vcomp. When tdest is smaller than tfin, the routine proceeds to step S1108 to obtain a correction coefficient Kdest for tdest from the table. Kdest is a constant equal to or smaller than "1". Thereafter, the routine proceeds to step S1109 to multiply Vcomp obtained in step S1103 by the correction coefficient Kdest and the routine proceeds to step S1106 to store Vcomp in the memory, thereby completing the processing.

As for voltage drop characteristics between the brush and the commutator of the motor, when a voltage larger than a predetermined value is applied to the motor, the breakdown of an oxide film on the surface of the commutator occurs, whereby a voltage drop becomes small in a moment. When the application of a voltage larger than a predetermined value comes to an end, the oxide film grows again and a voltage drop increases to a fixed value along with the passage of time.

It is considered that several tens of minutes to several hours passes until the ignition key is switched on after it is switched off and the oxide film grows during that time. Therefore, tdest may be initialized to a predetermined value larger than tfin at the same time when the electric power steering controller starts operation by the operation of the ignition key by a driver or the like. Thereby, a correction voltage Vcomp in the case where there is an oxide film is obtained when the electric power steering controller is started.

In Embodiment 11, the correction voltage is used as a function of application voltage hysteresis, set to a value smaller than a normal correction voltage value immediately when the inter-terminal voltage measurement value Vt_sns exceeds a predetermined value and increased to a normal correction voltage value along with the passage of time when Vt_sns falls below the predetermined value. Therefore, the correction voltage can be always set to a value corresponding to actual voltage drop characteristics between the brush and the commutator, whereby the estimation accuracies of the motor rotation estimation value west and the motor acceleration estimation value dwest are improved and control performance is enhanced.

In this Embodiment, the correction voltage Vcomp is changed based on the inter-terminal voltage measurement value Vt_sns. It is needless to say that the correction voltage may be changed based on the voltage instruction signal Vt_ind or the weighted mean of the inter-terminal voltage measurement value Vt_sns and the voltage instruction signal Vt_ind.

Embodiment 12

A description is subsequently given of Embodiment 12.

In Embodiment 11, the correction voltage Vcomp is changed based on the inter-terminal voltage measurement value Vt_sns. In Embodiment 12, the correction voltage Vcomp is changed based on the coil current measurement value Isns.

Figure 22:
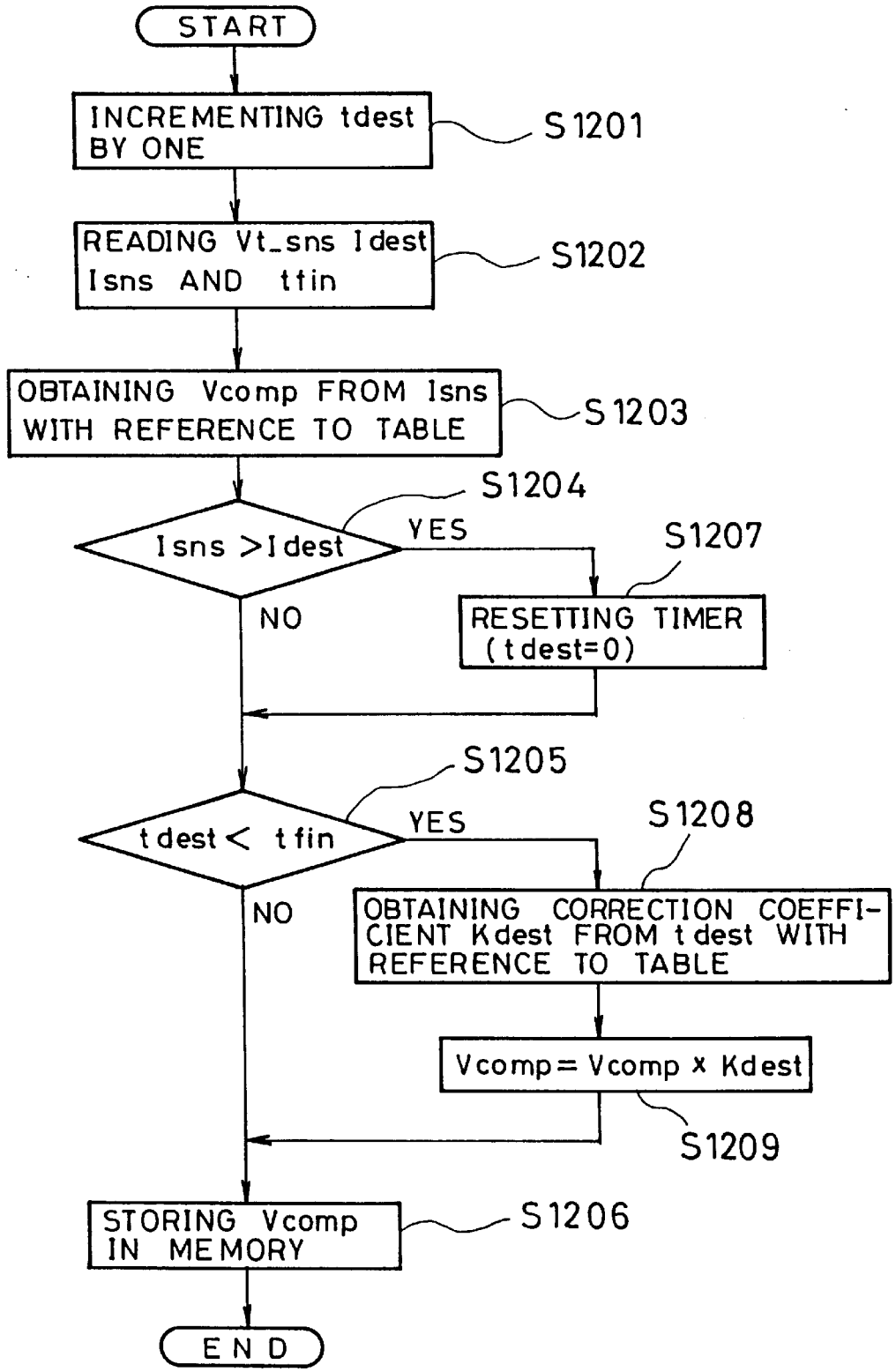
FIG. 22 is a flow chart showing the algorithms of Embodiment 12.

The operation of Embodiment 12 for determining the voltage correction value Vcomp will be described with reference to the flow chart of FIG. 22.

In step S1201, the count value tdest of the software timer is first incremented by one. Tdest is clipped to prevent an overflow caused by count-up. In the subsequent step S1202, the inter-terminal voltage measurement value Vt_sns, the coil current measurement value Isns, and Idest and tfin prestored in the ROM are first read. Idest is set to a value equal to a current value at which an oxide film on the commutator of the motor breaks down. Tfin is set to a value equal to a time period from the time when a voltage drop Vbr between the brush and the commutator becomes small by the breakdown to the time when the voltage drop Vbr returns to a normal voltage drop value. In the next step S1203, a correction voltage vcomp for the coil current measurement value Isns is read from a table. In the subsequent step S1204, the coil current measurement value Isns and Idest are compared with each other. When the coil current measurement value Isns is equal to or smaller than Idest, the routine proceeds to step S1205. When the coil current measurement value Isns is larger than Idest, the count value tdest of the timer is reset to "0" in step S1207 and the routine proceeds to step S1205. In step S1205, tdest and tfin are compared with each other. When tdest is equal to or larger than tfin, the routine proceeds to step S1206 to store Vcomp obtained in step S1203 in the memory, thereby completing the processing of determining vcomp. When tdest is smaller than tfin, the routine proceeds to step S1208 to obtain a correction coefficient Kdest for tdest from the table. Kdest is a constant equal to or smaller than "1". Thereafter, the routine proceeds to step S1209 to multiply Vcomp obtained in step S1203 by the correction coefficient Kdest and the routine proceeds to step S1206 to store Vcomp in the memory, thereby completing the processing.

Although the breakdown of the oxide film on the surface of the commutator occurs when a voltage higher than a predetermined value is applied to the motor, a large current runs upon the occurrence of the breakdown. In this embodiment, the correction voltage is used as a function of motor current hysteresis, set to a value smaller than a normal correction voltage value immediately when the coil current measurement value Isns exceeds a predetermined value and increased to a normal correction voltage value along with the passage of time when Isns falls below the predetermined value. The occurrence of the breakdown can be detected with more certainty than when it is judged by voltage.

In this embodiment, the correction voltage is changed based on the coil current measurement value Isns. The correction voltage may be changed based on the target current Iref.

Embodiment 13

In Embodiments 1 to 12, so-called current feed-back that an error between the target current Iref and the coil current measurement value Isns is calculated and a voltage instruction signal Vt_ind is set based on the error by current control unit 2b is carried out in the drive voltage generator. In Embodiment 13, the voltage instruction signal Vt_ind is set in an open-loop manner from the physical relational expressions of the coil current Ia. Since the constitution of Embodiment 13 is the same as those of other embodiments except the drive voltage generator 2, its description is omitted.

Figure 23:
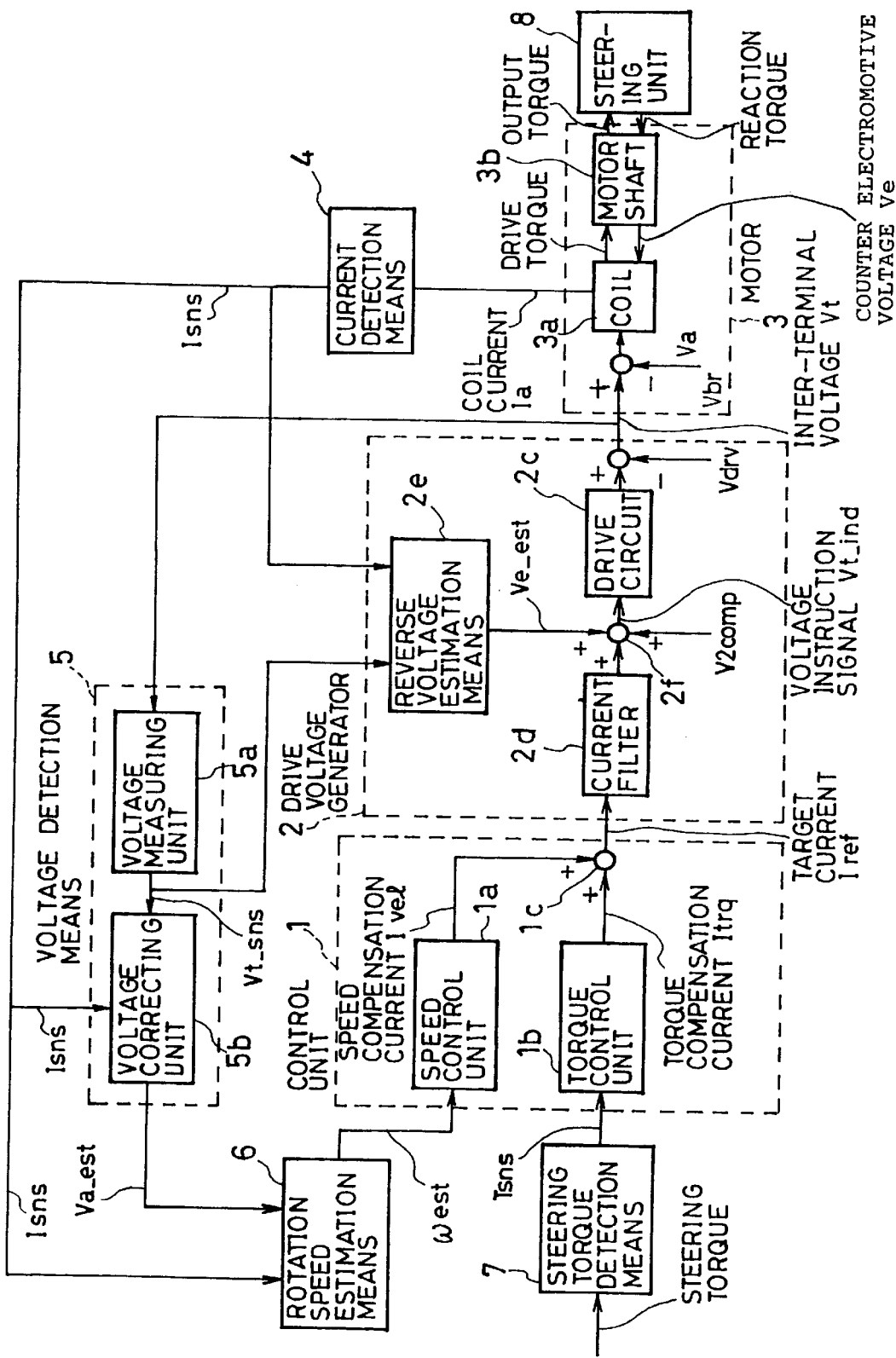
FIG. 23 is a block diagram showing the constitution of Embodiment 13.

With reference to FIG. 23, the constitution of Embodiment 13 will be described hereinunder.

Reference numeral 2 denotes a drive voltage generator for outputting an inter-terminal voltage Vt to be applied to the motor based on the target current Iref generated by the control unit 1. The drive voltage generator comprises a current filter 2d for calculating a voltage Vc_ind equivalent to a voltage drop Vc in the coil with respect to the target current Iref, counter electromotive voltage estimation means 2e for obtaining a counter electromotive voltage estimation value Ve_est from the inter-terminal voltage measurement value Vt_sns and the coil current measurement value Isns, and a drive voltage adder 2f for generating a voltage instruction signal Vt_ind by adding Vc_ind, the counter electromotive voltage estimation value Ve_est and the circuit correction voltage V2comp.

Figure 24:
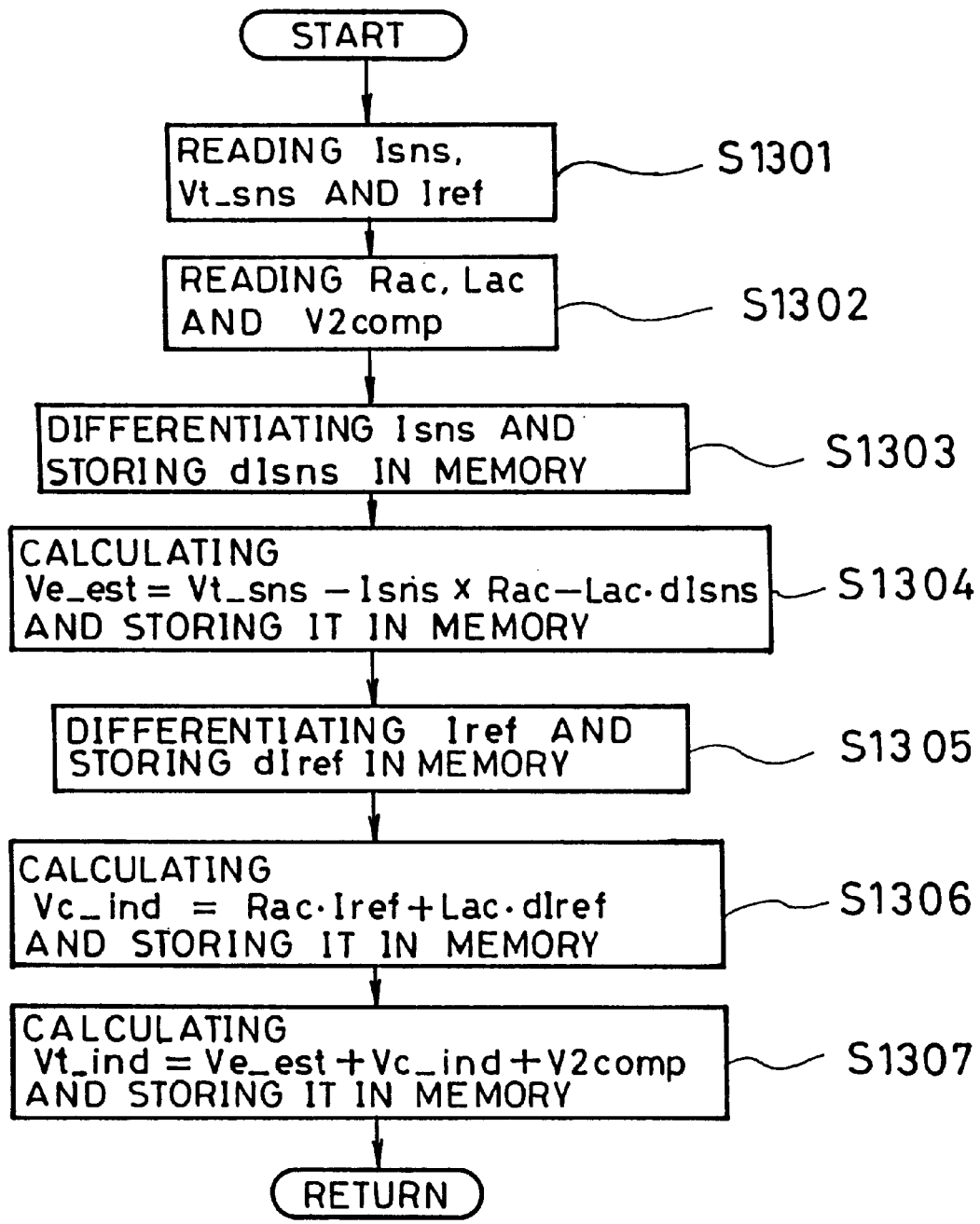
FIG. 24 is a flow chart showing the algorithms of Embodiment 13.

With reference to the flow chart of FIG. 24, the operation of Embodiment 13 will be described.

In step S1301, the target current Iref calculated by the control unit 1, the coil current measurement value Isns measured by the current detection means, and the inter-terminal voltage measurement value Vt_sns measured by the voltage measuring unit 5a are first read. In the subsequent step S1302, the coil resistance equivalent value Rac, the coil inductance equivalent value Lac, and the circuit correction voltage V2comp equivalent to the voltage drop Vdrv are read. Steps S1303 and S1304 show the operation of the counter electromotive voltage estimation means 2e. In step S1303, the coil current measurement value Isns is differentiated and the obtained value is stored as dIsns in the memory. In the next step S1304, the counter electromotive voltage estimation value Ve_est is calculated from the following equation (21) and stored in the memory.

$$Ve\_est = Vt\_sns - Isns \times Rac - Lac \cdot dIsns \qquad (21)$$

Steps S1305 and S1306 show the operation of the current filter 2d. In step S1305, the target current Iref is differentiated and the obtained value is stored as dIref in the memory. In the next step S1306, the voltage Vc_ind equivalent to the voltage drop Vc in the coil with respect to the target current Iref is calculated from the following equation (22) and stored in the memory.

$$Vc\_ind = Rac \cdot Iref + Lac \cdot dIref \qquad (22)$$

Step S1307 shows the operation of the drive voltage adder 2f for calculating the voltage instruction signal Vt_ind from the following equation (23) and outputting it to the drive circuit 2c.

$$Vt\_ind = Ve\_est + Vc\_ind + V2comp \qquad (23)$$

Steps S1301 to S1307 are repeated each time sampling is made.

The voltage Vc_ind equivalent to the voltage drop Vc in the coil with respect to the target current Iref and the counter electromotive voltage estimation value Ve_est may be processed by a low-pass filter to remove the influence of noise.

In this embodiment, the influence of the circuit correction voltage V2comp is compensated in the calculation of the voltage instruction signal Vt_ind. This is based on the following reason.

Suppose that the following relation represented by the following equation (24) is established. That is, there is no measurement error between the inter-terminal voltage Vt and the coil current Isns, and true values of coil resistance Ra and coil inductance La are known.

$$Vt\_sns = Vt, \; Isns \times Rac + Lac \cdot dIsns = Vc \qquad (24)$$

An error is produced between the counter electromotive voltage ad the counter electromotive voltage estimation value by the influence of Vbr as shown in the following equation (25).

$$Ve\_est - Ve = (Va + Vbr - Vc) - (Va - Vc) = Vbr \qquad (25)$$

The relation between the voltage drop Vc in the coil and the voltage Vc_ind equivalent to Vc with respect to the target current Iref is represented by the following equation (26).

$$Vc = Vt\_ind - Vbr - Vdrv - Ve = (Ve\_est + Vc\_ind + V2comp) - Vbr - Vdrv - \\ Ve = Ve\_est - Ve + Vc\_ind + V2comp - Vbr - Vdrv = Vc\_ind + V2comp - \\ Vdrv \qquad (26)$$

The influence of Vbr is canceled, and the voltage drop Vdrv at the drive circuit 2c is compensated by the circuit correction voltage V2comp, whereby the voltage drop Vc in the coil matches the voltage Vc_ind equivalent to Vc with respect to the target current Iref and the coil current Ia matches the target current Iref.

Therefore, the influence of the circuit correction voltage V2comp must be compensated to calculate the voltage instruction signal Vt_ind.

Embodiment 14

In Embodiment 13, the counter electromotive voltage estimation means 2e calculates the counter electromotive voltage estimation value Ve_est from the inter-terminal voltage measurement value Vt_sns and the coil current measurement value Isns. In Embodiment 14, the counter electromotive voltage measurement value Ve_est is calculated using the voltage instruction signal Vt_ind in place of the inter-terminal voltage measurement value Vt_sns.

Figure 25:
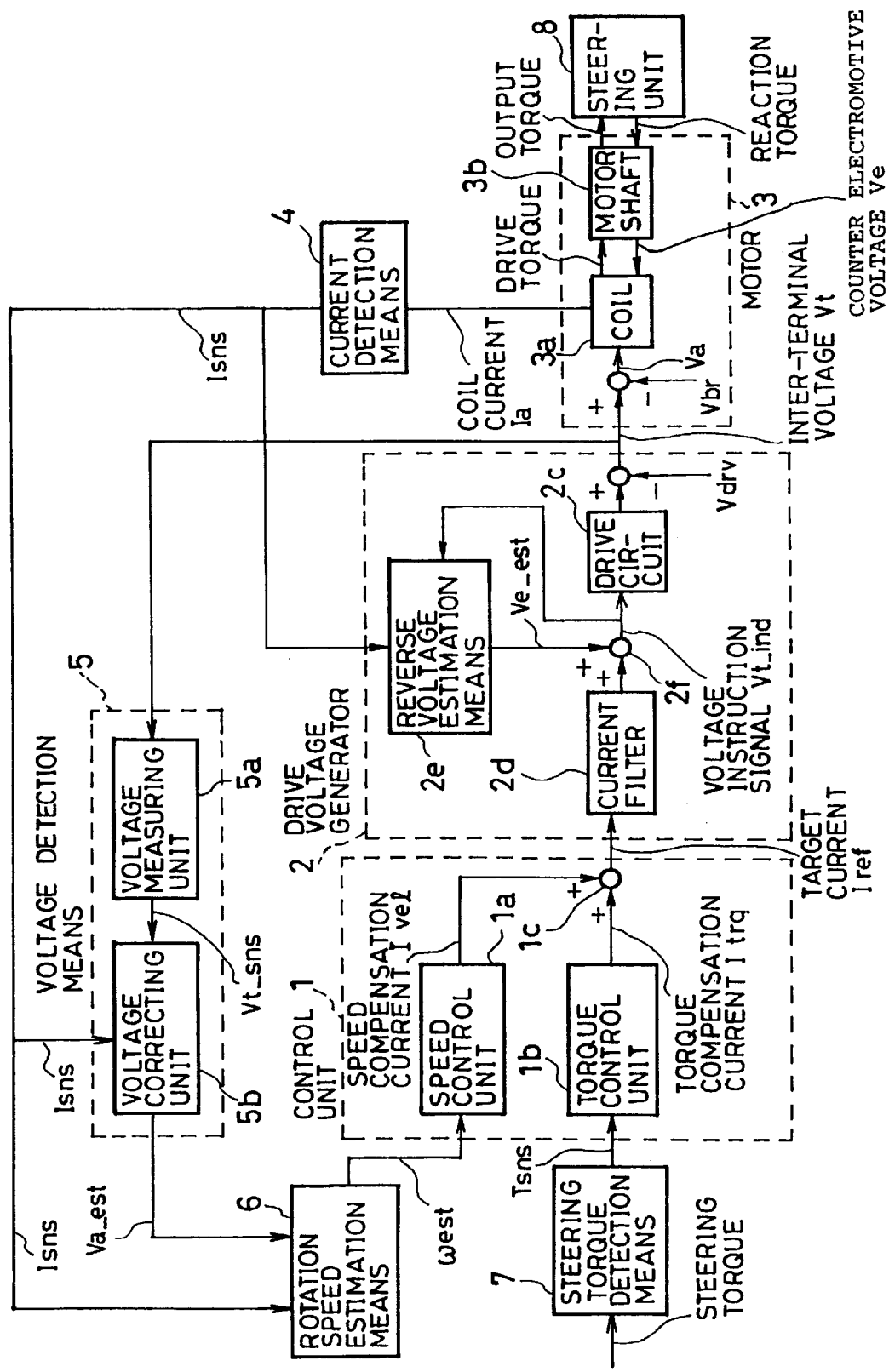
FIG. 25 is a block diagram showing the constitution of Embodiment 14.
Figure 26:
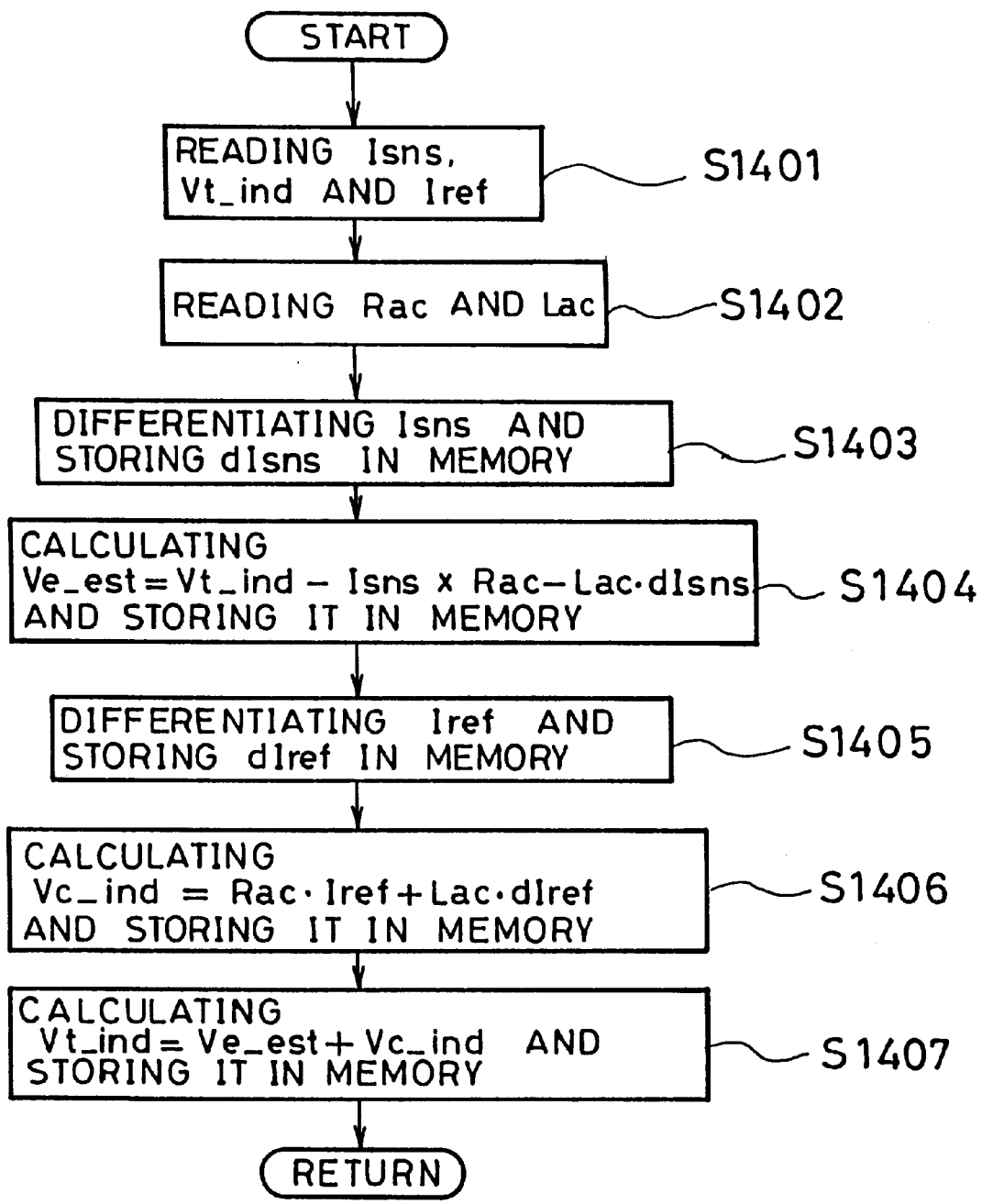
FIG. 26 is a flow chart showing the algorithms of Embodiment 14.
Figure 27:
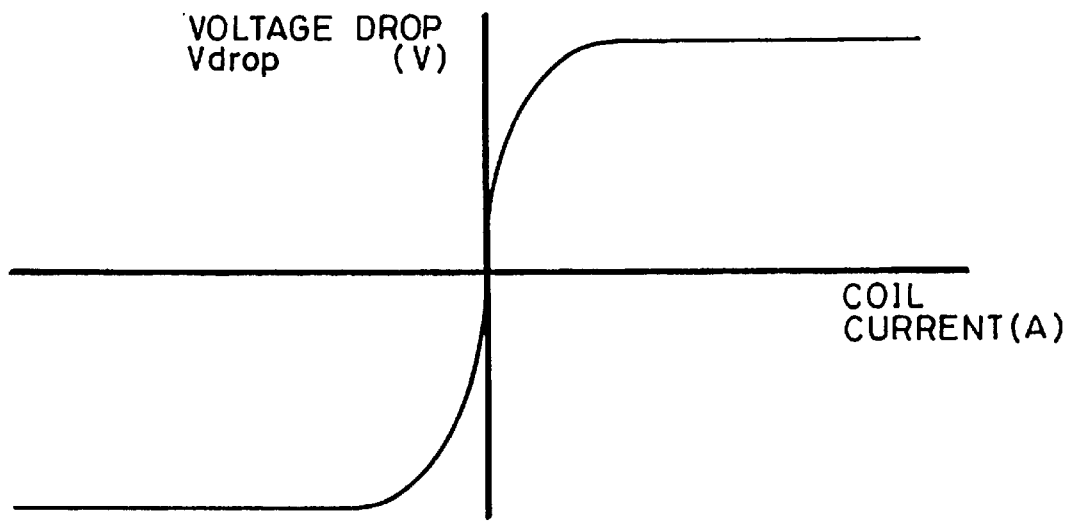
FIG. 27 is a diagram showing the characteristics of a voltage drop between the brush and commutator of a motor.
Figure 28:
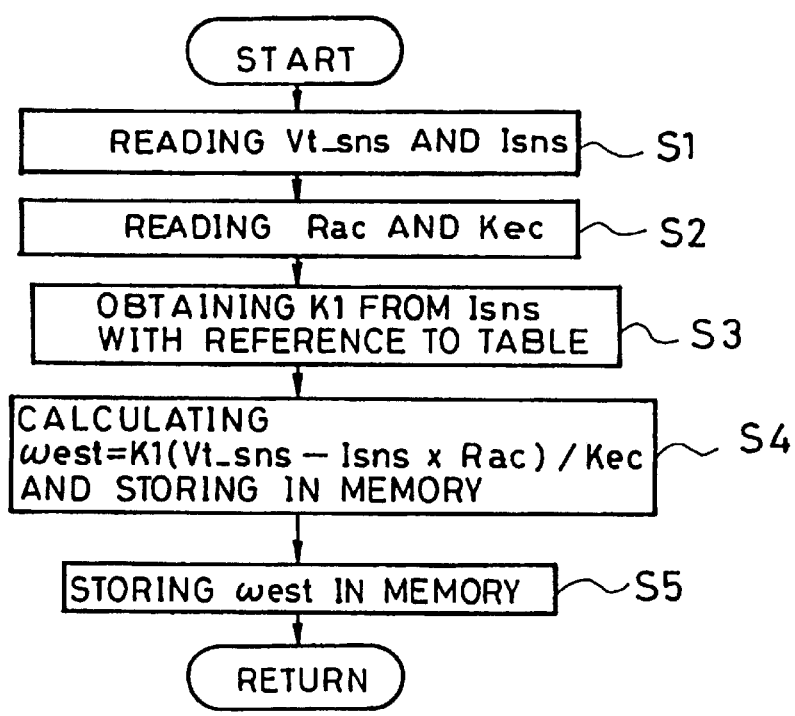
FIG. 28 is a flow chart showing calculation algorithms of an electric power steering controller of the prior art.

FIG. 25 is a block diagram showing the constitution of Embodiment 14 and FIG. 26 is a flow chart showing the operation of Embodiment 14.

In the block diagram, Embodiment 14 is the same as Embodiment 13 except that the voltage instruction signal Vt_ind is applied to the counter electromotive voltage estimation means 2e in place of the inter-terminal voltage measurement value Vt_sns and the circuit correction voltage V2comp is not corrected in the calculation of the voltage instruction signal Vt_sns. Therefore, a description of the constitution of Embodiment 14 is omitted.

The operation of Embodiment 14 is the same as that of Embodiment 13 except that the inter-terminal voltage measurement value Vt_sns is replaced by the voltage instruction signal Vt_ind in step S1401 and step S1404 of the flow chart and the circuit correction voltage V2comp is not corrected in the calculation of the voltage instruction signal Vt_sns in step S1407. Therefore, a description of the operation of Embodiment 14 is omitted.

In this embodiment, the reason why the circuit correction voltage V2comp is not corrected in the calculation of the voltage instruction signal Vt_ind is as follows.

An error is produced between the counter electromotive voltage and the counter electromotive voltage estimation value by the influence of Vbr and Vdrv as shown in the following equation (27).

$$Ve\_est - Ve = (Va + Vdrv + Vbr - Vc) - (Va - Vc) = Vdrv + Vbr \qquad (27)$$

The relation between the voltage drop Vc in the coil and the voltage Vc_ind equivalent to Vc with respect to the target current Iref is represented by the following equation (28).

$$Vc = Vt\_ind - Vbr - Vdrv - Ve = (Ve\_est + Vc\_ind) - Vbr - Vdrv - Ve = Ve\_\\est - Ve + Vc\_ind - Vbr - Vdrv = Vc\_ind \qquad (28)$$

The influence of Vbr and Vdrv is canceled, whereby the voltage drop Vc in the coil matches the voltage Vc_ind equivalent to vc with respect to the target current Iref and the coil current Ia matches the target current Iref.

Therefore, the influence of Vbr and Vdrv does not need to be compensated to calculate the voltage instruction signal Vt_ind.

According to the first aspect of the present invention, since the voltage detection means provides to the rotation speed estimation means a value obtained by subtracting a correction voltage obtained based on the output of the current detection means from the inter-terminal voltage measurement value of the motor as an application voltage estimation value, the influence of a voltage drop between the brush and the commutator which is a function of a current running through the motor can be compensated. Thereby, the counter electromotive voltage of the motor can be estimated with accuracy, the accuracy of the rotation speed estimation value is improved regardless of the motor rotation speed, and excellent controllability can be obtained without oscillation when control is made based on this rotation speed estimation value.

According to the second aspect of the present invention, since a correction voltage at the voltage detection means is obtained with reference to voltage drop characteristics between the brush and commutator of the motor, the counter electromotive voltage of the motor can be estimated with higher accuracy, the accuracy of the rotation speed estimation value is improved regardless of the motor rotation speed, and excellent controllability can be thereby obtained without oscillation when control is made based on this rotation speed estimation value.

According to the third aspect of the present invention, since a correction voltage at the voltage detection means is a value obtained by multiplying a voltage drop between the brush and commutator of the motor by a coefficient smaller than 1, even when the motor has a small voltage drop between the brush and the commutator due to errors and time changes of the motor or the like, it is possible to prevent the inversion of the polarity of the motor rotation speed estimation value which occurs when a larger correction voltage than the actual value is subtracted. Therefore, when control is made based on this motor rotation speed estimation value, the polarity of the control value does not change, and excellent controllability without oscillation can be obtained.

According to the fourth aspect of the present invention, since the control unit calculates a target current using a differential signal obtained by differentiating the output of the rotation speed estimation means, an accurate rotation acceleration signal can be obtained regardless of the rotation speed of the motor and the control of inertial force is made possible, thereby making it possible to achieve higher controllability than when only a rotation speed estimation value is used as a control signal.

According to the fifth aspect of the present invention, since a correction voltage at the voltage detection means is a function whose upper limit is the maximum value out of voltage drop values between the brush and commutator of the motor or a value obtained by multiplying it by a coefficient smaller than 1 and which is substantially proportional to the output of the current detection means below the upper limit and saturated at the upper limit to become constant, the capacity of the memory can be reduced without lowering the estimation accuracy of the motor rotation speed when voltage drop characteristics between the brush and the commutator are stored in the ROM.

According to the sixth aspect of the present invention, since a correction voltage at the voltage detection means equivalent to a voltage drop between the brush and the commutator is output by a relay circuit which is switched only by the sign of the output of the current detection means and whose amplitude is the maximum voltage drop value between the brush and the commutator or a value obtained by multiplying it by a coefficient smaller than 1, the capacity of the memory for storing voltage drop characteristics between the brush and the commutator can be reduced and the processing speed of algorithms is improved because an addition operation is eliminated.

According to the seventh aspect of the present invention, since a correction voltage at the voltage detection means equivalent to a voltage drop between the brush and the commutator is output by a relay circuit which is switched only by the sign of the difference between terminal voltage measurement values of a double-phase motor and whose amplitude is the maximum voltage drop between the brush and the commutator or a value obtained by multiplying it by a coefficient smaller than 1, the motor rotation speed can be estimated with high accuracy without being influenced by an offset of the current detection value because the application direction of a current is generally determined by the sign of the difference between terminal voltages of the double-phase motor.

According to the eighth aspect of the present invention, since the voltage detection mean subtracts correction voltages equivalent to a voltage drop caused by the drive circuit and to a voltage drop between the brush and the commutator from a motor drive voltage instruction value instructed by the control unit, it is not necessary to detect an inter-terminal voltage and the influence of an offset of an inter-terminal voltage detection value caused by temperature characteristics or the like can be eliminated.

According to the ninth aspect of the present invention, since the voltage detection means obtains a weighted average of a voltage calculated from the inter-terminal voltage measurement value of the motor and a voltage calculated from a motor drive voltage instruction value and makes large the weight of the voltage obtained from the measurement value when a large current is not detected and the weight of the voltage obtained from the motor drive voltage instruction value when a large current is detected, it is possible to estimate the measurement accuracy of an inter-terminal voltage of the motor and minimize the effects of a measurement error between terminal voltages of the motor and an error of estimation from the motor drive voltage instruction value.

Since the motor rotation speed estimation value is a signal used to compensate for damping, when the correction voltage is too large, the motor speed estimation value becomes small, whereby damping fails to work. Accordingly, control stability is low in some cases. Since a differential value of the motor rotation speed estimation signal is used to compensate for inertia, when the correction voltage is too small, inertia compensation works too much. Accordingly, control stability is low in some cases.

According to the tenth aspect of the present invention, the correction voltage is divided into a first correction voltage for obtaining a rotation speed estimation value and a second correction voltage for obtaining a differential signal for the rotation speed estimation value, and the second correction voltage is made larger than the first correction voltage. Therefore, even when there are variations and fluctuations in voltage drop characteristics between the brush and the commutator, it is possible to prevent damping from failing to work and inertia compensation from working too much. Therefore, control stability is always not impaired by the correction voltage.

According to the eleventh aspect of the present invention, since the correction voltage calculated based on the target current is subtracted from the motor inter-terminal voltage measurement value, the motor drive voltage instruction value instructed by the control unit, or the weighted mean value thereof, the target current value does not contain a nose component. Therefore, the correction voltage is not influenced by the noise component contained in the detection current.

As for voltage drop characteristics between the brush and the commutator of the motor, when a voltage larger than a predetermined value is applied to the motor, the voltage drop becomes small in a moment due to the occurrence of the breakdown of an oxide film on the surface of the commutator. When the application of voltage comes to an end, the oxide film grows again and the voltage drop increases to a predetermined value along with the passage of time.

According to the twelfth aspect of the present invention, the correction voltage is used as a function of motor voltage hysteresis, set to a value smaller than a normal correction voltage value immediately when the motor inter-terminal voltage measurement value, the motor drive voltage instruction value or the weighted mean value thereof exceeds a predetermined value, and increased to a normal correction voltage value along with the passage of time when the value falls below the predetermined value. Therefore, the correction voltage can be always set to a value corresponding to actual voltage drop characteristics between the brush and the commutator.

The breakdown of the oxide film on the surface of the commutator occurs when a voltage larger than a predetermined value is applied to the motor. A large current runs upon the occurrence of the breakdown.

According to the thirteenth aspect of the present invention, the correction voltage is used as a function of motor current hysteresis, set to a value smaller than a normal correction voltage value immediately when the output of the current detection means or the target current value exceeds a predetermined value, and increased to a normal correction voltage value along with the passage of time when the value falls below the predetermined value. Therefore, the occurrence of the breakdown can be detected with more certainty than when it is judged by voltage.

What is claimed is:

1. An electric power steering controller comprising:
   a motor for generating a torque for assisting a driver's steering torque;
   a steering unit for transmitting the steering torque from a steering wheel to wheels in an automobile;
   voltage detection means calculating or receiving one or both of a motor drive voltage instruction value and an inter-terminal voltage measurement value for detecting a voltage applied to the motor;
   current detection means for detecting a current running through a coil of the motor;
   rotation speed estimation means for estimating a rotation speed of the motor based on said voltage detected by the voltage detection means and said current detected by the current detection means; and
   a control unit for calculating a target current for driving the motor based on at least said rotation speed estimated by the rotation speed estimation means,
   wherein the voltage detection means determines a correction voltage, based on a detection current value detected by the current detection means or said target current and outputs an application voltage estimation value, where said application voltage estimation value is obtained by subtracting said correction voltage from one or a combination of said motor drive voltage instruction value and said inter-terminal voltage measurement value of the motor, and
   wherein the rotation speed estimation means estimates the rotation speed of the motor based on the application voltage estimation value from the voltage detection means and the detection current value from the current detection means.

2. The electric power steering controller of claim 1, wherein said correction voltage used by the voltage detection means is obtained with reference to a voltage drop occurring between a brush and a commutator of the motor.

3. The electric power steering controller of claim 1, wherein said correction voltage used by the voltage detection means is a value obtained by multiplying a voltage drop occurring between a brush and a commutator of the motor by a coefficient value less than 1.

4. The electric power steering controller of claim 1, wherein the control unit calculates a target current using a differential signal obtained by differentiating the output of the rotation speed estimation means.

5. The electric power steering controller of claim 4, wherein the correction voltage has a first correction voltage for obtaining a rotation speed estimate value and a second correction voltage for obtaining a differential signal for the rotation speed estimation value, and a magnitude of the second correction voltage is set larger than a magnitude of the first correction voltage to insure stability.

6. The electric power steering controller of claim 1, wherein said correction voltage used by the voltage detection means is a function having an upper limit that is a maximum voltage drop value which occurs between a brush and a commutator of the motor, wherein the function has a value obtained by multiplying an output of the current detection means by a coefficient value less than 1 and is substantially proportional to the output of the current detection means below the upper limit and saturated at the upper limit.

7. The electric power steering controller of claim 1, wherein said correction voltage used by the voltage detection means is output by a relay circuit which is switched only by a sign of the output of the current detection means, and the amplitude of the relay circuit is a maximum voltage drop value occurring between a brush and a commutator of the motor or a value obtained by multiplying an output of the current detection means by a coefficient value less than 1.

8. The electric power steering controller of claim 1, wherein said correction voltage used by the voltage detection means is output by a relay circuit which is switched only by the sign of the difference between terminal voltage measurement values of a double-phase motor, and the amplitude of the relay circuit is the maximum voltage drop value occurring between a brush and a commutator of the motor or a value obtained by multiplying an output of the current detection means by a coefficient value less than 1.

9. The electric power steering controller of claim 1, wherein the voltage detection means subtracts a plurality of correction voltages, obtained from a voltage drop caused by a drive circuit for driving the motor and from a voltage drop occurring between a brush and a commutator of the motor, from said motor drive voltage instruction value instructed by the control unit.

10. The electric power steering controller of claim 1, wherein the voltage detection means obtains said application voltage estimation value by weight averaging a first detection voltage obtained by subtracting said correction voltage, equivalent to a voltage drop occurring between a brush and a commutator of the motor, from said inter-terminal voltage measurement value of the motor and a second detection voltage obtained by subtracting a plurality of correction voltages, obtained from a voltage drop caused by a drive circuit for driving the motor and from said voltage drop between the brush and commutator of the motor, from said motor drive voltage instruction value instructed by the control unit and changes the weights of the first detection voltage and the second detection voltage based on a hysteresis of an output of the current detection means, such that the first detection voltage is weighted more heavily when a large current is not detected and the second detection voltage is weighted more heavily said when a large current is detected.

11. The electric power steering controller of claim 1, wherein the voltage detection means subtracts said correction voltage calculated based on a target current valve from said motor inter-terminal voltage measurement value, said motor drive voltage instruction value instructed by the control unit, or a weighted mean value thereof.

12. The electric power steering controller of claim 1, wherein the correction voltage is a function of motor voltage hysteresis, and is set to a value smaller than a normal correction voltage value when said motor inter-terminal voltage measurement value, said motor drive voltage instruction value or a weighted mean value thereof, exceeds a predetermined value and the correction voltage is increased to said normal correction voltage value, after a passage of time, when the value falls below the predetermined value.

13. The electric power steering controller of claim 1, wherein the correction voltage is a function of motor current hysteresis, and is set to a value smaller than a normal correction voltage value when an output of the current detection means or a target current value exceeds a predetermined value and the correction voltage is increased to said normal correction value, after a passage of time, when the value falls below the predetermined value.

* * * * *